(12) United States Patent
Zhang et al.

(10) Patent No.: US 9,683,590 B2
(45) Date of Patent: Jun. 20, 2017

(54) STRUT SYSTEM AND STRUT FITTING THEREFOR

(71) Applicant: Cooper Technologies Company, Houston, TX (US)

(72) Inventors: Zhihui Zhang, Edwardsville, IL (US); William Edward McCarthy, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 182 days.

(21) Appl. No.: 14/702,190

(22) Filed: May 1, 2015

(65) Prior Publication Data

US 2015/0316085 A1    Nov. 5, 2015

Related U.S. Application Data

(60) Provisional application No. 61/987,731, filed on May 2, 2014.

(51) Int. Cl.
| | | |
|---|---|---|
| *F16B 37/04* | (2006.01) | |
| *F16B 7/04* | (2006.01) | |
| *F16B 9/02* | (2006.01) | |
| *F16L 3/24* | (2006.01) | |

(52) U.S. Cl.
CPC .............. *F16B 7/04* (2013.01); *F16B 7/0433* (2013.01); *F16B 9/02* (2013.01); *F16B 9/026* (2013.01); *F16L 3/24* (2013.01)

(58) Field of Classification Search
CPC ...... F16B 7/187; F16B 37/045; F16B 37/046; F16L 3/24
See application file for complete search history.

(56) References Cited

U.S. PATENT DOCUMENTS

| | | | |
|---|---|---|---|
| 1,813,545 | A | 7/1931 | Reinhold |
| 1,963,908 | A | 6/1934 | Manasek |
| 2,307,653 | A | 1/1943 | Wright |
| 2,375,513 | A | 5/1945 | Bach |

(Continued)

FOREIGN PATENT DOCUMENTS

| | | |
|---|---|---|
| CN | 202416847 U | 9/2012 |
| DE | 7701100 | 5/1977 |

(Continued)

OTHER PUBLICATIONS

Drawing of MQM Wing Nut, (at least as early as Mar. 13, 2012), (1) pg.

(Continued)

*Primary Examiner* — Rodney Mintz
*Assistant Examiner* — Daniel Kenny
(74) *Attorney, Agent, or Firm* — Senniger Powers LLP

(57) ABSTRACT

A strut fitting for a strut includes a fitting body having opposite ends and a length extending between the opposite ends. First and second opposite faces extend along the length of the body. Opposite sides are disposed between the first and second faces and extend along the length of the body. The first face and at least portions of the opposite sides adjacent the first face define a first cross-sectional shape of the fitting body that is generally dovetail-shaped. A catch is secured to and extends outward from the first face of the fitting body. The catch is resiliently deflectable relative to the fitting body.

26 Claims, 24 Drawing Sheets

(56) References Cited

U.S. PATENT DOCUMENTS

| | | |
|---|---|---|
| 2,420,826 A | 5/1947 | Irrgang |
| 2,470,991 A | 5/1949 | Kindorf et al. |
| 2,846,169 A | 8/1953 | Sullivan |
| 2,767,609 A * | 10/1956 | Cousino ............... F16B 37/046 24/290 |
| 2,767,951 A * | 10/1956 | Cousino ............... A47B 57/54 248/245 |
| 3,226,069 A | 12/1965 | Clarke |
| 3,310,264 A | 3/1967 | Appleton |
| 3,312,034 A | 4/1967 | Steinmann |
| 3,396,499 A | 8/1968 | Biffani |
| 3,417,951 A | 12/1968 | Rebentisch, Jr. |
| 3,451,183 A | 6/1969 | Lespagnol et al. |
| 3,463,428 A | 8/1969 | Kindorf et al. |
| 3,486,726 A | 12/1969 | Kindorf et al. |
| 3,513,606 A | 5/1970 | Jones |
| 3,527,432 A | 9/1970 | Lytle |
| 3,547,385 A | 12/1970 | Kindorf |
| 3,566,561 A | 3/1971 | Tozer |
| 3,592,493 A | 7/1971 | Goose |
| 3,601,347 A | 8/1971 | Attwood |
| 3,612,461 A | 10/1971 | Brown |
| 3,650,499 A | 3/1972 | Biggane |
| 3,752,198 A | 8/1973 | Fiorentino et al. |
| 3,757,485 A | 9/1973 | Vincens |
| 3,944,308 A | 3/1976 | Persson |
| 3,986,314 A | 10/1976 | Moeller |
| 3,998,419 A | 12/1976 | Semmerling |
| 4,044,428 A | 8/1977 | Kowalski |
| 4,185,802 A | 1/1980 | Myles et al. |
| 4,211,381 A | 7/1980 | Heard |
| 4,216,930 A | 8/1980 | Rossler, Jr. et al. |
| 4,227,355 A | 10/1980 | Wendt |
| 4,358,216 A | 11/1982 | Pleickhardt et al. |
| 4,379,651 A | 4/1983 | Nagashima |
| 4,417,711 A | 11/1983 | Madej |
| 4,479,341 A | 10/1984 | Schuplin |
| 4,516,296 A | 5/1985 | Sherman |
| 4,610,562 A | 9/1986 | Dunn |
| 4,637,748 A | 1/1987 | Beavers |
| 4,657,458 A | 4/1987 | Woller et al. |
| 4,708,554 A | 11/1987 | Howard |
| 4,726,165 A | 2/1988 | Brinsa |
| 4,830,531 A | 5/1989 | Condit et al. |
| 4,948,313 A | 8/1990 | Zankovich |
| 4,950,099 A | 8/1990 | Roellin |
| 4,961,553 A | 10/1990 | Todd |
| 5,022,614 A | 6/1991 | Rinderer |
| D322,929 S * | 1/1992 | Abbestam ............... D8/397 |
| 5,102,074 A | 4/1992 | Okada |
| 5,141,186 A | 8/1992 | Cusic |
| 5,146,724 A | 9/1992 | Angelo |
| 5,163,644 A | 11/1992 | Kowalski |
| 5,175,971 A | 1/1993 | McCombs |
| 5,228,263 A | 7/1993 | Vaughn |
| 5,335,890 A | 8/1994 | Pryor et al. |
| 5,351,926 A | 10/1994 | Moses |
| 5,375,798 A | 12/1994 | Hungerford, Jr. |
| 5,489,173 A * | 2/1996 | Hofle ............... F16B 37/046 411/104 |
| 5,503,511 A * | 4/1996 | Flamme ............... F16B 37/046 411/104 |
| 5,595,363 A | 1/1997 | De Leebeeck |
| 5,628,508 A | 5/1997 | Koole |
| 5,628,598 A | 5/1997 | Höfle |
| 5,655,865 A | 8/1997 | Plank et al. |
| 5,729,948 A | 3/1998 | Levy et al. |
| 5,746,535 A | 5/1998 | Kohler |
| 5,779,412 A * | 7/1998 | Nagai ............... E04B 2/766 411/104 |
| 5,799,452 A * | 9/1998 | Moore ............... E04B 1/2604 52/233 |
| 5,799,907 A | 9/1998 | Andronica |
| 5,806,897 A | 9/1998 | Nagai et al. |
| 5,820,322 A | 10/1998 | Hermann et al. |
| 5,855,342 A | 1/1999 | Hawkins et al. |
| 5,864,997 A | 2/1999 | Kelly |
| 5,918,999 A | 7/1999 | Lamarca |
| 5,924,650 A | 7/1999 | Richichi |
| 5,927,041 A | 7/1999 | Sedlmeier et al. |
| 5,984,243 A | 11/1999 | Pfaller et al. |
| 5,988,930 A | 11/1999 | Liebetrau et al. |
| 6,061,984 A | 5/2000 | Rose |
| 6,062,764 A * | 5/2000 | Rixen ............... F16B 37/046 403/22 |
| 6,322,030 B1 | 11/2001 | Marra |
| 6,484,358 B1 | 11/2002 | Duong et al. |
| 6,494,415 B1 | 12/2002 | Roth |
| 6,572,057 B1 | 6/2003 | Roth |
| 6,655,099 B1 | 12/2003 | Trenoweth |
| 6,660,938 B2 | 12/2003 | Herb et al. |
| 6,679,461 B1 | 1/2004 | Hawkins |
| 6,682,253 B2 | 1/2004 | Binna et al. |
| 6,712,543 B1 | 3/2004 | Schmalzhofer |
| 6,726,117 B2 | 4/2004 | Herb et al. |
| 6,751,914 B2 | 6/2004 | Zeh et al. |
| 7,014,213 B1 | 3/2006 | Kaiser |
| 7,044,701 B2 | 5/2006 | Herb |
| 7,096,641 B2 | 8/2006 | Birnbaum et al. |
| 7,179,010 B2 | 2/2007 | Weger et al. |
| 7,240,884 B2 | 7/2007 | Shim |
| 7,287,733 B2 | 10/2007 | Bongio et al. |
| 7,389,621 B2 | 6/2008 | Hawes |
| 7,448,822 B2 * | 11/2008 | Nebeker ............... B60R 13/0206 24/580.1 |
| 7,478,787 B2 | 1/2009 | Bankston et al. |
| 7,484,697 B1 | 2/2009 | Nelson |
| 7,600,724 B2 | 10/2009 | Nelson et al. |
| 7,604,444 B2 | 10/2009 | Wu |
| 7,661,915 B2 | 2/2010 | Whipple |
| 7,818,925 B2 | 10/2010 | Benedict |
| 7,922,130 B2 | 4/2011 | Hawkins |
| 7,922,417 B2 | 4/2011 | Jimenez |
| 7,984,601 B2 | 7/2011 | Bimbaum et al. |
| 8,100,600 B2 | 1/2012 | Blum |
| 8,225,581 B2 | 7/2012 | Strickland et al. |
| 8,303,223 B2 | 11/2012 | Rass et al. |
| 8,341,913 B2 | 1/2013 | Meres et al. |
| 8,366,340 B2 | 2/2013 | Munakata et al. |
| 8,454,259 B2 | 6/2013 | Oetlinger |
| 8,465,242 B2 | 6/2013 | Arendt et al. |
| 8,511,929 B2 | 8/2013 | Raye et al. |
| 8,523,923 B2 | 9/2013 | Thomke et al. |
| 8,567,030 B2 | 10/2013 | Koch et al. |
| 8,596,009 B2 | 12/2013 | Baxter et al. |
| 8,661,765 B2 | 3/2014 | Schaefer et al. |
| 8,662,455 B2 | 3/2014 | Hernandez et al. |
| 8,695,296 B2 | 4/2014 | Bergman |
| D728,753 S | 5/2015 | Hikoyama |
| 9,187,898 B1 | 11/2015 | Underkofler et al. |
| 9,194,418 B2 | 11/2015 | Parthibhan et al. |
| 2002/0000498 A1 | 1/2002 | Workman |
| 2002/0060280 A1 | 5/2002 | Yaphe et al. |
| 2002/0110435 A1 | 8/2002 | Herb et al. |
| 2002/0122691 A1 | 9/2002 | Wood |
| 2003/0042033 A1 | 3/2003 | Herb et al. |
| 2003/0043033 A1 | 3/2003 | Lee |
| 2003/0063961 A1 | 4/2003 | Lay |
| 2003/0122044 A1 | 7/2003 | Unverzagt et al. |
| 2003/0159397 A1 | 8/2003 | Birnbaum |
| 2004/0165943 A1 | 8/2004 | Herb |
| 2004/0165947 A1 | 8/2004 | Herb |
| 2004/0165965 A1 | 8/2004 | Unverzagt et al. |
| 2004/0228681 A1 | 11/2004 | Herb |
| 2005/0116123 A1 | 6/2005 | Bailey et al. |
| 2005/0129458 A1 | 6/2005 | Hoffmann |
| 2006/0027715 A1 | 2/2006 | Dinh et al. |
| 2006/0038398 A1 | 2/2006 | Whipple et al. |
| 2007/0040075 A1 | 2/2007 | Moretto |
| 2007/0075213 A1 | 4/2007 | Foser et al. |
| 2007/0101670 A1 | 5/2007 | Ahren et al. |
| 2007/0120036 A1 | 5/2007 | Olle et al. |
| 2007/0145222 A1 | 6/2007 | Rausch |

(56) References Cited

U.S. PATENT DOCUMENTS

| | | |
|---|---|---|
| 2007/0248793 A1 | 10/2007 | Herb et al. |
| 2008/0229699 A1 | 9/2008 | Nehls |
| 2010/0102011 A1 | 4/2010 | Blum |
| 2010/0193645 A1 | 8/2010 | Merhar et al. |
| 2012/0110788 A1 | 5/2012 | Chen |
| 2012/0119037 A1 | 5/2012 | Azuma et al. |
| 2012/0286110 A1 | 11/2012 | Hill |
| 2012/0297723 A1 | 11/2012 | Siddiqui et al. |
| 2012/0315106 A1 | 12/2012 | Amedt et al. |
| 2014/0042286 A1 | 2/2014 | Jaffari |
| 2014/0091050 A1 | 4/2014 | Zhang |
| 2014/0093307 A1 | 4/2014 | Zhang |
| 2014/0097304 A1 | 4/2014 | Mastro |
| 2014/0197284 A1 | 7/2014 | Hikoyama |
| 2014/0283475 A1 | 9/2014 | Zhang et al. |
| 2015/0276092 A1 | 10/2015 | Oliver et al. |

FOREIGN PATENT DOCUMENTS

| | | |
|---|---|---|
| DE | 8232700 U1 | 6/1983 |
| DE | 3513382 A1 | 10/1986 |
| DE | 8704502 U1 | 7/1987 |
| DE | 102006035405 A1 | 5/2008 |
| DE | 202010004406 U1 | 7/2010 |
| DE | 102009000603 A1 | 9/2010 |
| DE | 20 2012 102 394 U1 | 9/2012 |
| EP | 0592743 A1 | 4/1994 |
| GB | 569377 | 5/1945 |
| GB | 687403 | 2/1953 |
| GB | 1157545 | 7/1969 |
| GB | 1370645 | 10/1974 |
| JP | 2000139583 | 5/2000 |
| WO | 9837349 A1 | 8/1998 |
| WO | 2013125821 A1 | 8/2013 |
| WO | 2014159372 A1 | 10/2014 |

OTHER PUBLICATIONS

HILTI MI/MZ Technical Guide, 4.2 MQ System Components—Load Data and Material Specifications, MQM Wing Nut, (at least as early as Mar. 13, 2012), 1 page, www.us.hilti.com, Canada.

UNISTRUT, P1000® & P1001 Channels, (at least as early as Mar. 13, 2012), 1 page.

UNISTRUT, P1100® & P1101 Channels, (at least as early as Mar. 13, 2012), 1 page.

UNISTRUT, P2000® & P2001 Channels, (at least as early as Mar. 13, 2012), 1 page.

UNISTRUT, Channels Nuts, Top Retainer Nut, (at least as early as Mar. 13, 2012), 1 page.

Power-Strut Engineering Catalog, Pictorial Table of Contents, (at least as early as Mar. 13, 2012), pp. 11-14, www.alliedeg.

B-LINE by EATON—Channel Nuts & Hardware, Strut Systems, (at least as early as Mar. 13, 2012), pp. 45-53.

Final Office action for U.S. Appl. No. 13/966,897, Feb. 2, 2016, 16 pages.

Non-Final Office action for U.S. Appl. No. 14/298,483, Feb. 5, 2016, 11 pages.

Non-Final Office action for U.S. Appl. No. 14/298,461, Feb. 8, 2016, 12 pages.

Power-Strut Engineering Catalog, Tyco International. 2008, retrieved on Jan. 5, 2016, http://www.power-strut.com/DB/PDF1/Power-Strut-Catalog_2008.pdf, pp. 63, 65.

Unistrut General Engineering Catalog. Catalog [online]. Unistrut Corporation. Mar. 1, 1998, retrieved on Jan. 5, 2016, http://www.unistrut.us/DB/PDF_Archive/No_ 12.pdf, pp. 117, 118.

* cited by examiner

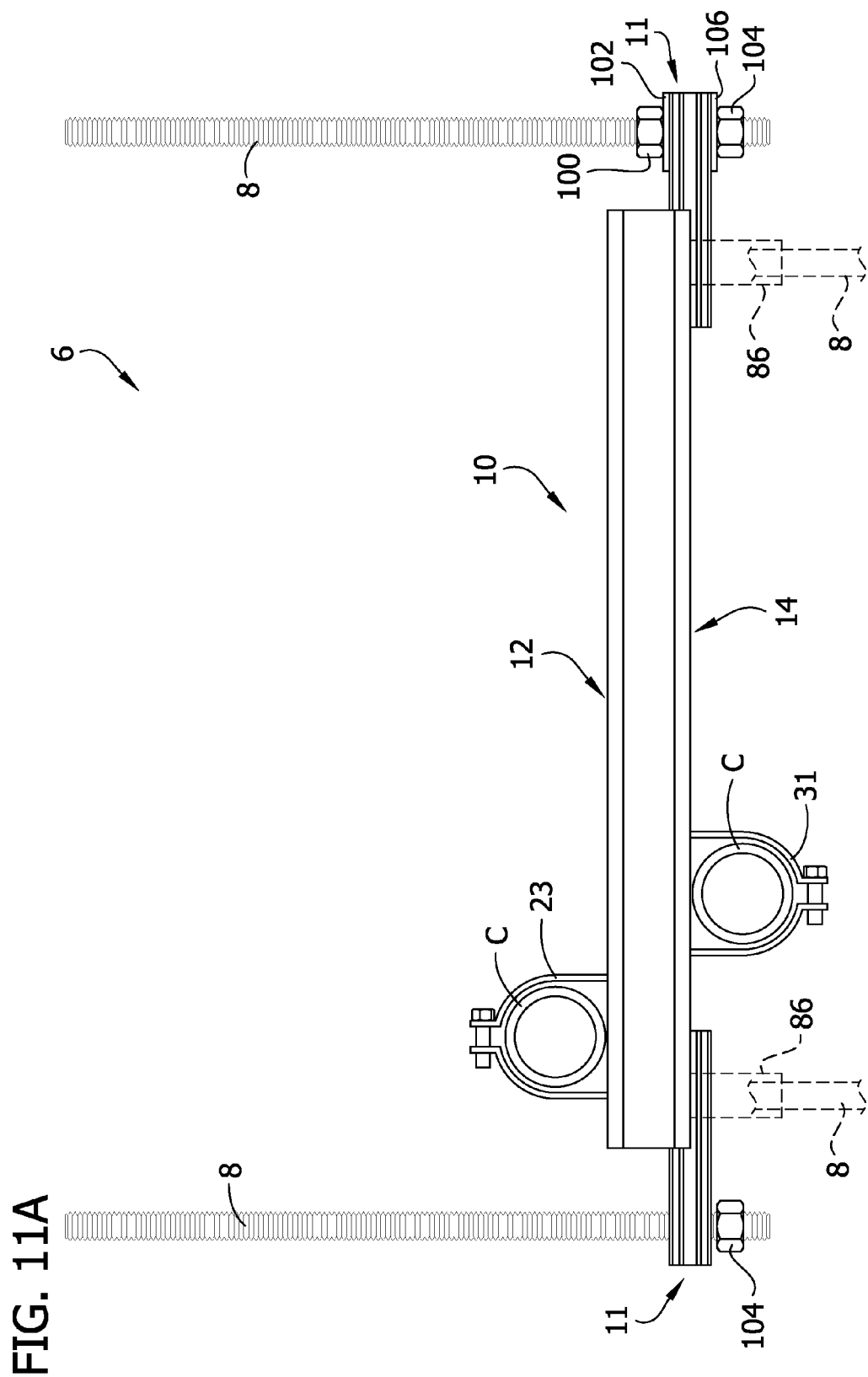

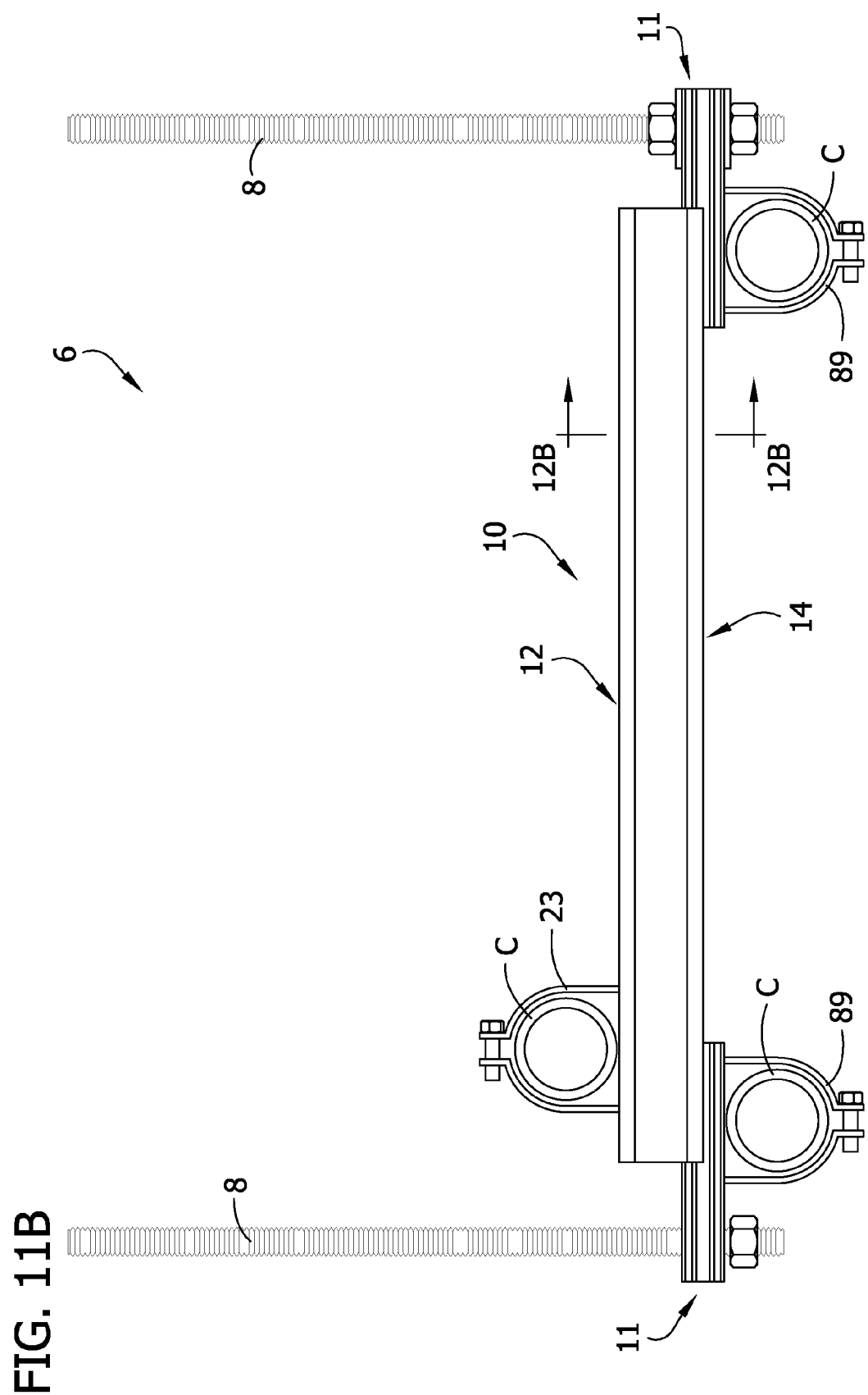

STRUT SYSTEM AND STRUT FITTING THEREFOR

FIELD OF THE DISCLOSURE

The present invention generally relates to a strut system, and a strut fitting for the strut system.

BACKGROUND

One type of channel framing is called strut channel (or simply "strut"), which is used in the construction and electrical industries for structural support, often for supporting wiring, plumbing, or mechanical components such as air conditioning or ventilation systems. Strut is usually formed from metal sheet, folded over to define an open channel with inturned lips to provide additional stiffness and as a location to mount interconnecting components. A fastener nut may be inserted into the interior of the channel framing, in opposing relationship to the open channel, for use in securing a part to the open channel side of the strut. The side of the strut opposite the open channel usually has holes of some sort in the base, to facilitate interconnection or fastening of the strut to underlying building structures.

Strut may be part of a trapeze hanger system to support one or more pipes and/or electrical cables (or other components) within a building or other structure. In one example, a trapeze hanger system includes one or more struts, each of which is secured to threaded rods depending from a ceiling. Each threaded rod passes through the open channel in the upper side and one of the openings in the lower side. Nut/washer sets are used to secure the strut to the threaded rods. In particular, an upper nut/washer set and a lower nut/washer set are secured to each rod (i.e., the nuts are threaded on the rods), such that the strut is sandwiched between the upper and lower nut/washer sets to fixedly secure the strut to the threaded rod. When secured to the rods, the strut is spaced from the ceiling in a generally horizontal orientation. The pipes and/or electrical cables may be secured to the upper side of the strut, such as by pipe clamps secured in the open channel from the strut, so that the pipes and/or electrical cables run horizontally in the building.

Strut may also be part of a wall-mounted system to support one or more pipes and/or electrical cables (or other components) on a wall of a building or other structure. In one example, a wall-mounted system includes one or more struts, each of which is secured to the wall using conventional brackets or clamps and fasteners. When secured to the wall, the strut may be in a generally horizontal orientation, with the open channel facing outward from the wall. The pipes and/or electrical cables may be secured to the strut, such as by pipe clamps secured in the open channel from the strut, so that the pipes and/or electrical cables run vertically in the building.

Although the conventional trapeze hanger and wall-mounted systems work quite well for securing pipes and/or electrical cables (or other components) within a structure, it can be time consuming to assembly the systems on site. Moreover, to provide additional functionality, two or more pieces of strut may be welded to one another. However, this assembled strut is typically special ordered and cannot be easily disassembled or otherwise changed, such as at the job site, to account for changes during the course of installing the struts.

SUMMARY OF THE DISCLOSURE

In one aspect, a strut fitting for a strut includes a fitting body having opposite ends and a length extending between the opposite ends. First and second opposite faces extend along the length of the body. Opposite sides are disposed between the first and second faces and extend along the length of the body. The first face and at least portions of the opposite sides adjacent the first face define a first cross-sectional shape of the fitting body that is generally dovetail-shaped. The second face of the fitting body defines a groove extending along the length of the body.

In another aspect, a strut fitting for a strut having at least one side defining a dovetail-shaped groove generally comprises a fitting body having opposite ends, a length extending between the opposite ends, first and second opposite faces extending along the length of the body, and opposite sides disposed between the first and second faces and extending along the length of the body. The first face and at least portions of the opposite sides adjacent the first face define a first cross-sectional shape of the fitting body that is generally dovetail-shaped. A catch is secured to and extends outward from the first face of the fitting body, wherein the catch is resiliently deflectable relative to the fitting body.

In another aspect, a strut system includes a piece of strut including an elongate strut body having opposite longitudinal ends, a length extending between the opposite longitudinal ends, and a fitting side defining an external fitting groove extending lengthwise of the body. The external fitting groove has opposite open groove ends at the opposite longitudinal ends of the strut body. A strut fitting for the piece of strut includes a fitting body having opposite ends and a length extending between the opposite ends. First and second opposite faces extend along the length of the body. Opposite sides are disposed between the first and second faces and extend along the length of the body. The first face and at least portions of the opposite sides adjacent the first face define a first cross-sectional shape of the fitting body sized and shaped for insertion through one of the open groove ends and into the external fitting groove of the piece of strut for connecting the strut fitting to the piece of strut. The second face of the fitting body defines a groove extending along the length of the body.

In yet another aspect, a method of assembling a strut system includes providing a piece of strut including an elongate strut body having opposite longitudinal ends and a length extending between the opposite first and second longitudinal ends. A fitting side defines an external fitting groove extending lengthwise of the strut body and has open groove ends. A strut fitting is provided. The strut fitting includes a fitting body having opposite ends and a length extending between the opposite ends. First and second opposite faces extend along the length of the body. Opposite sides are disposed between the first and second faces and extend along the length of the body. The first face and at least portions of the opposite sides adjacent the first face define a first cross-sectional shape of the fitting body sized and shaped for insertion into the external fitting groove of the piece of strut. The second face of the fitting body defines a groove extending along the length of the body. The strut fitting is inserted through one of the open groove ends and into the fitting groove of the piece of strut for connecting the strut fitting to the piece of strut. A component fitting configured to secure a component to the strut fitting is secured within the groove of the strut fitting.

Other features will be in part apparent and in part pointed out hereinafter.

BRIEF DESCRIPTION OF THE DRAWINGS

FIG. 11A is a side elevation of the assembled strut system of FIG. 1, including components secured to the strut and the strut fittings using component fittings;

FIG. 11B is similar to FIG. 11A, except different components are secured to the strut fittings using a different type of component fitting;

Corresponding reference characters indicate corresponding parts throughout the drawings.

DETAILED DESCRIPTION

Figure 1:
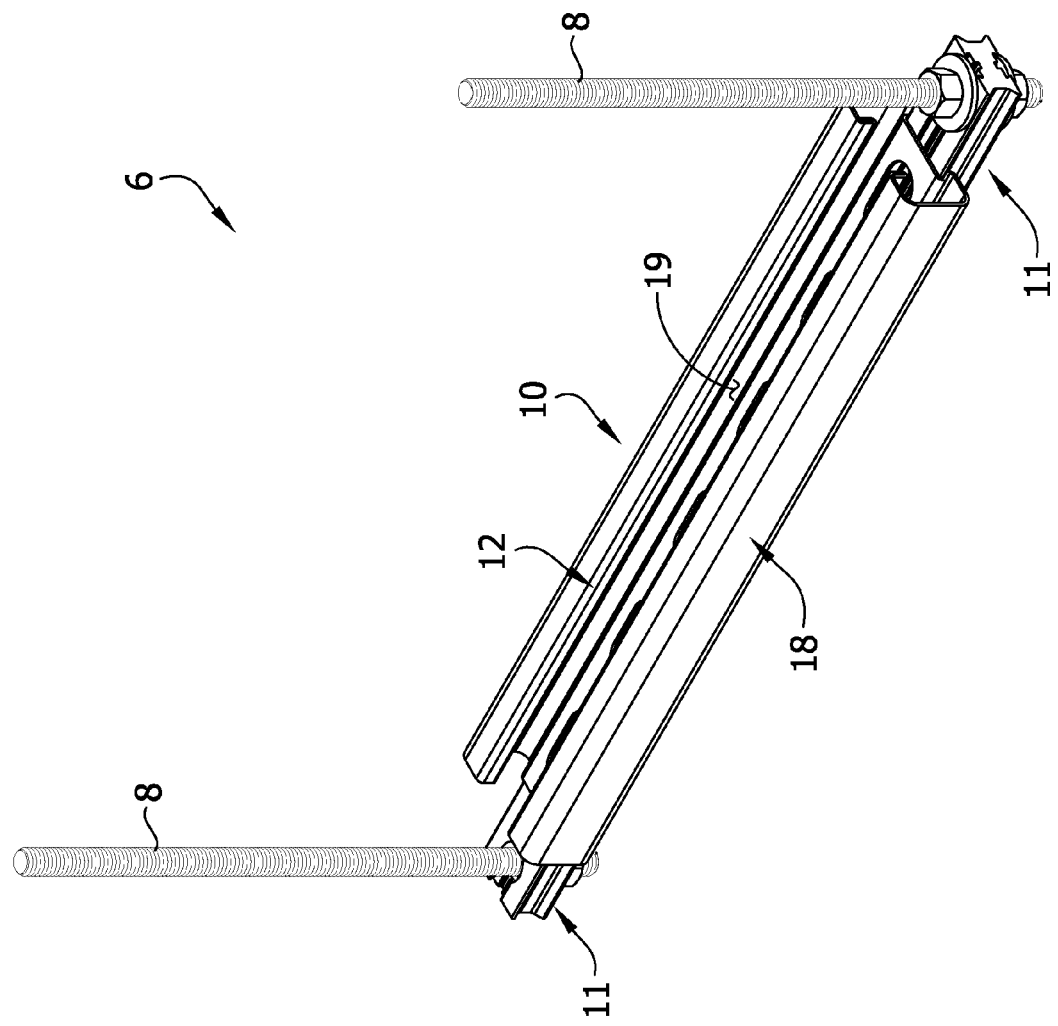
FIG. 1 is a front perspective of one embodiment of an assembled strut system in the form of a trapeze hanger system, the system including a strut, a pair of threaded rods, and a pair of strut fittings.
Figure 2:
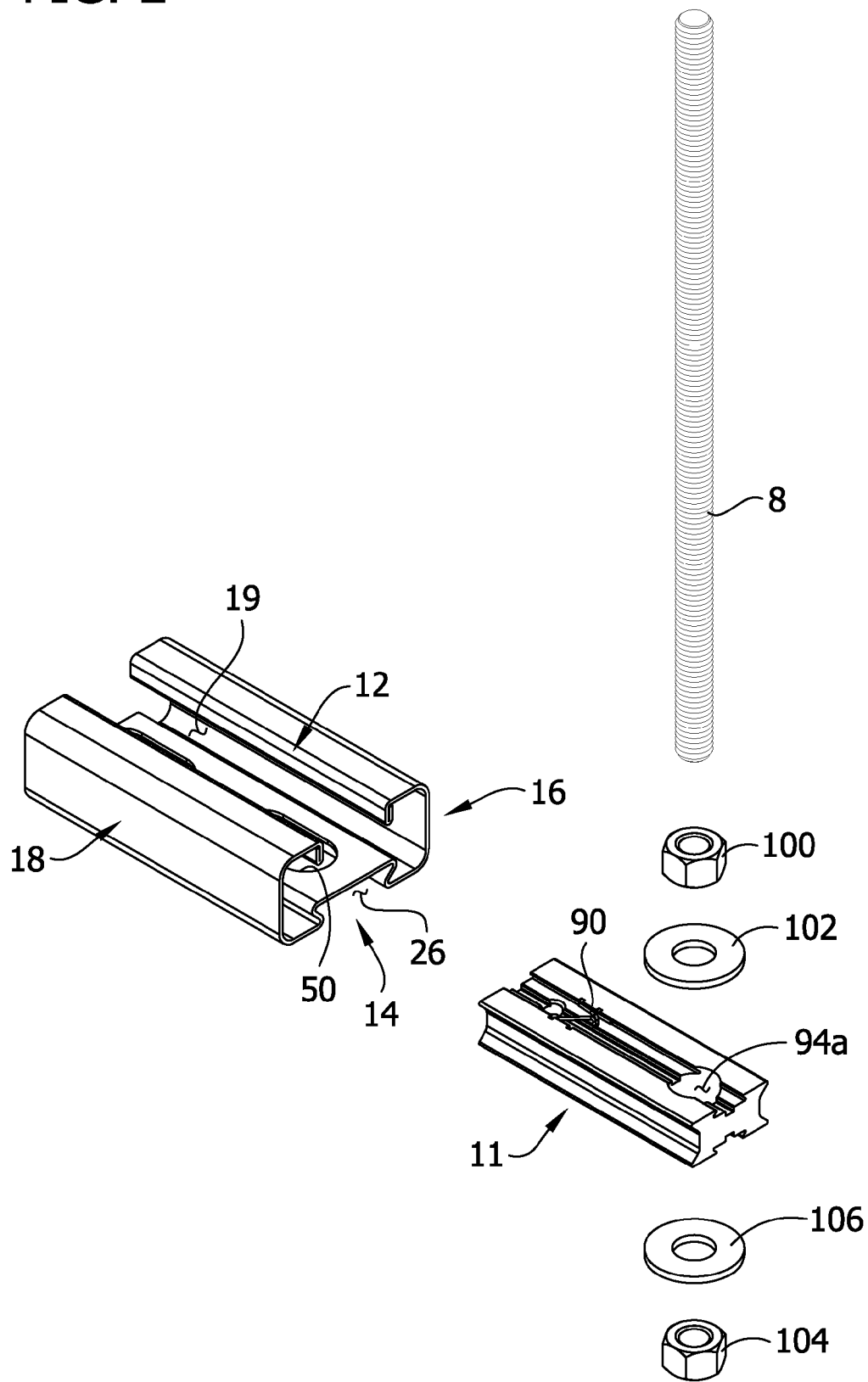
FIG. 2 is an enlarged, partial exploded view of FIG. 1.

The present disclosure is directed to a strut system. For example, the strut system generally indicated at reference numeral 6 in FIGS. 1 and 2 is a trapeze hanger system including rods 8 (e.g., two threaded rods), a strut, generally indicated at reference numeral 10, and strut fittings, each generally indicated at 11, for securing the strut to the threaded rods. In general, and as shown in FIGS. 11A and 11B, for example, the trapeze hanger system 6 is used to support one or more components C (e.g., pipes, electrical cables, cable trays, and the like) within a building or other structure. As explained in more detail below, in use the trapeze hanger system 6 is suspended from an elevated structure (e.g., a ceiling) and the components C may be supported by and secured to the strut 10 using suitable component fittings. Other embodiments of a strut system incorporating the strut fitting 11 are generally indicated at 6' in FIGS. 19 and 20. This strut system 6' is a wall-mount strut system, details of which are explained below. Other embodiments of a strut system are also disclosed herein.

Figure 3:
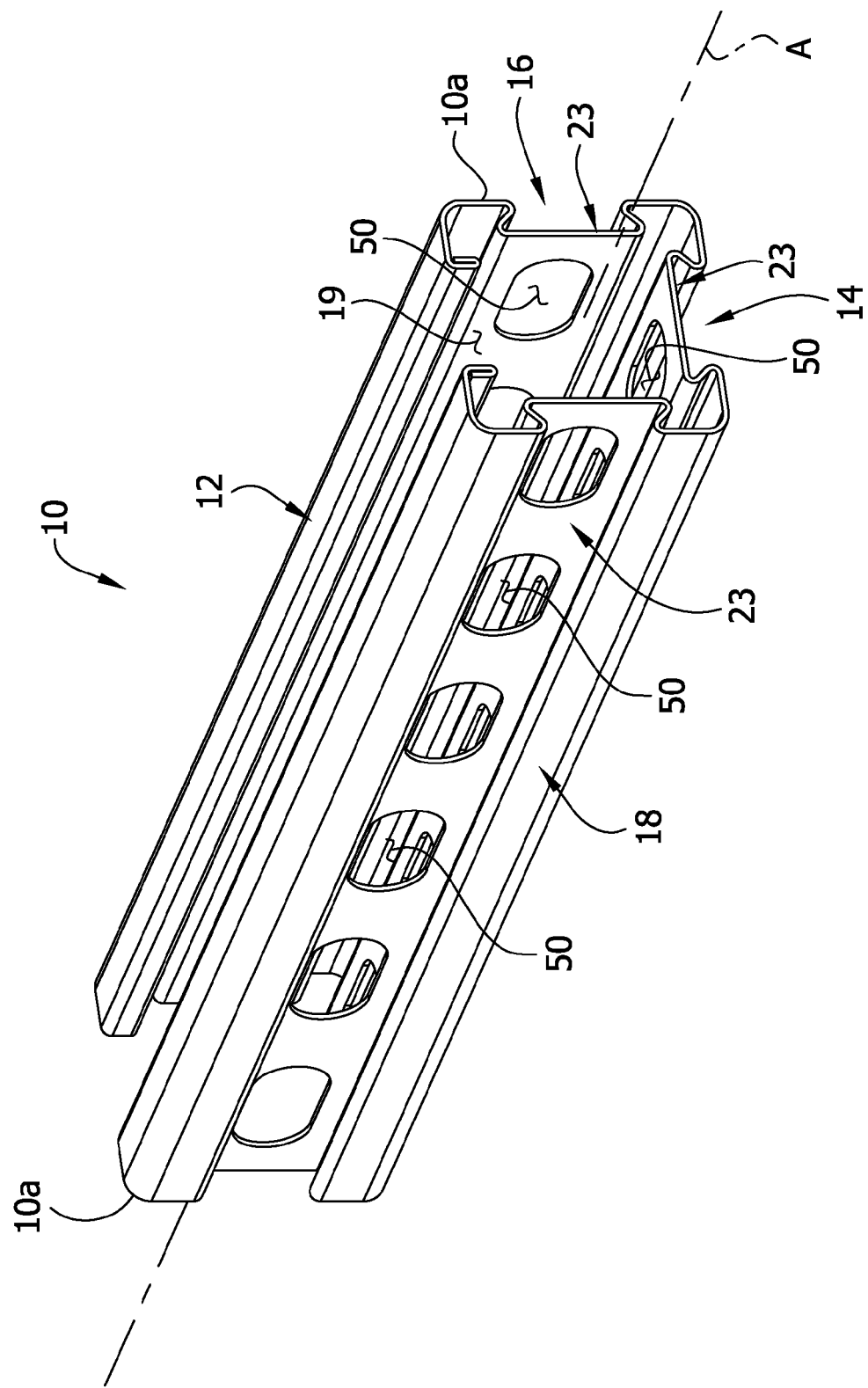
FIG. 3 is a front perspective of one embodiment of a suitable strut for use in the trapeze hanger system.
Figure 4:
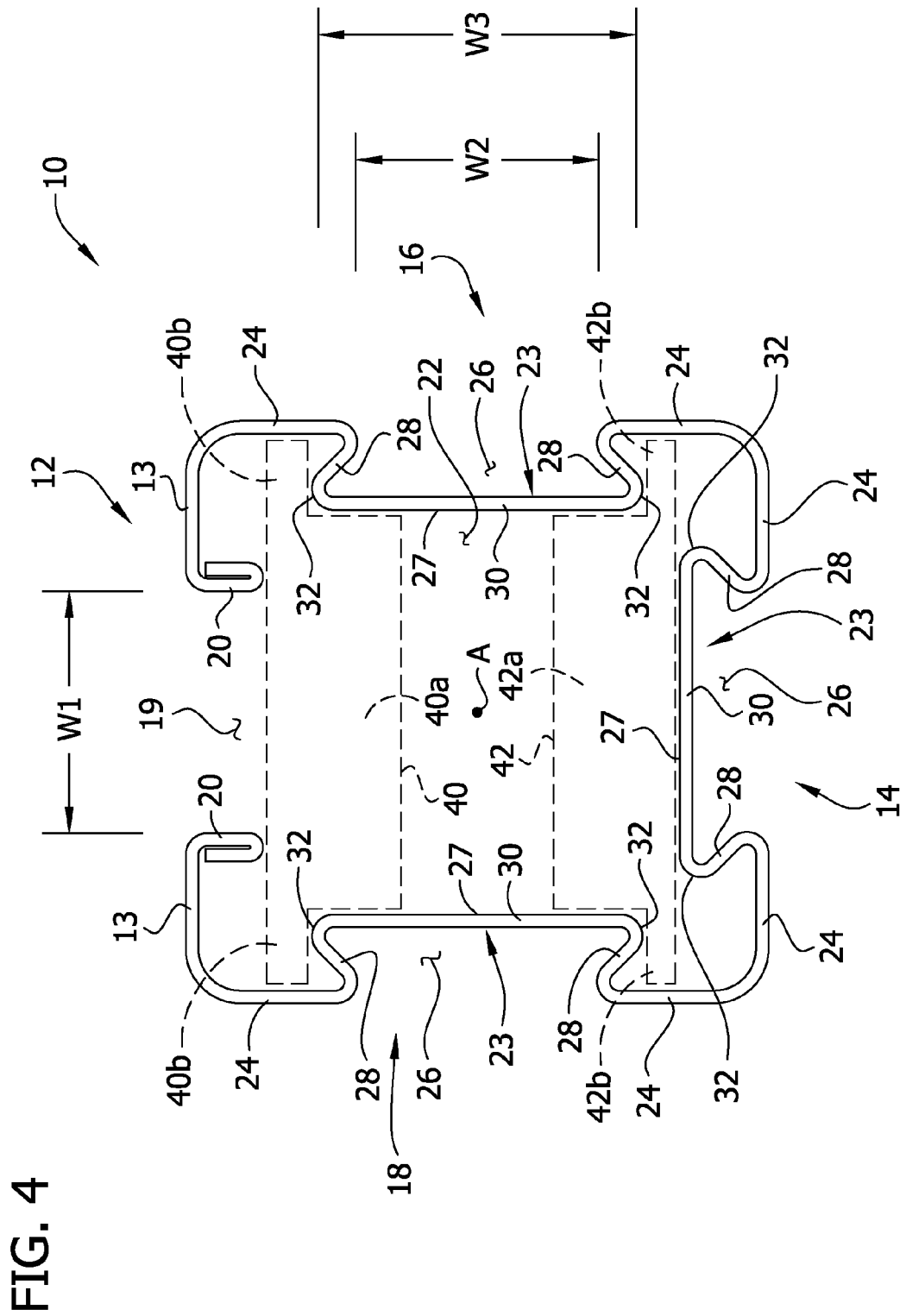
FIG. 4 is a front elevation of the strut, with upper and lower T-shaped tracks defined by an interior of the channel framing being shown in broken lines.
Figure 5:
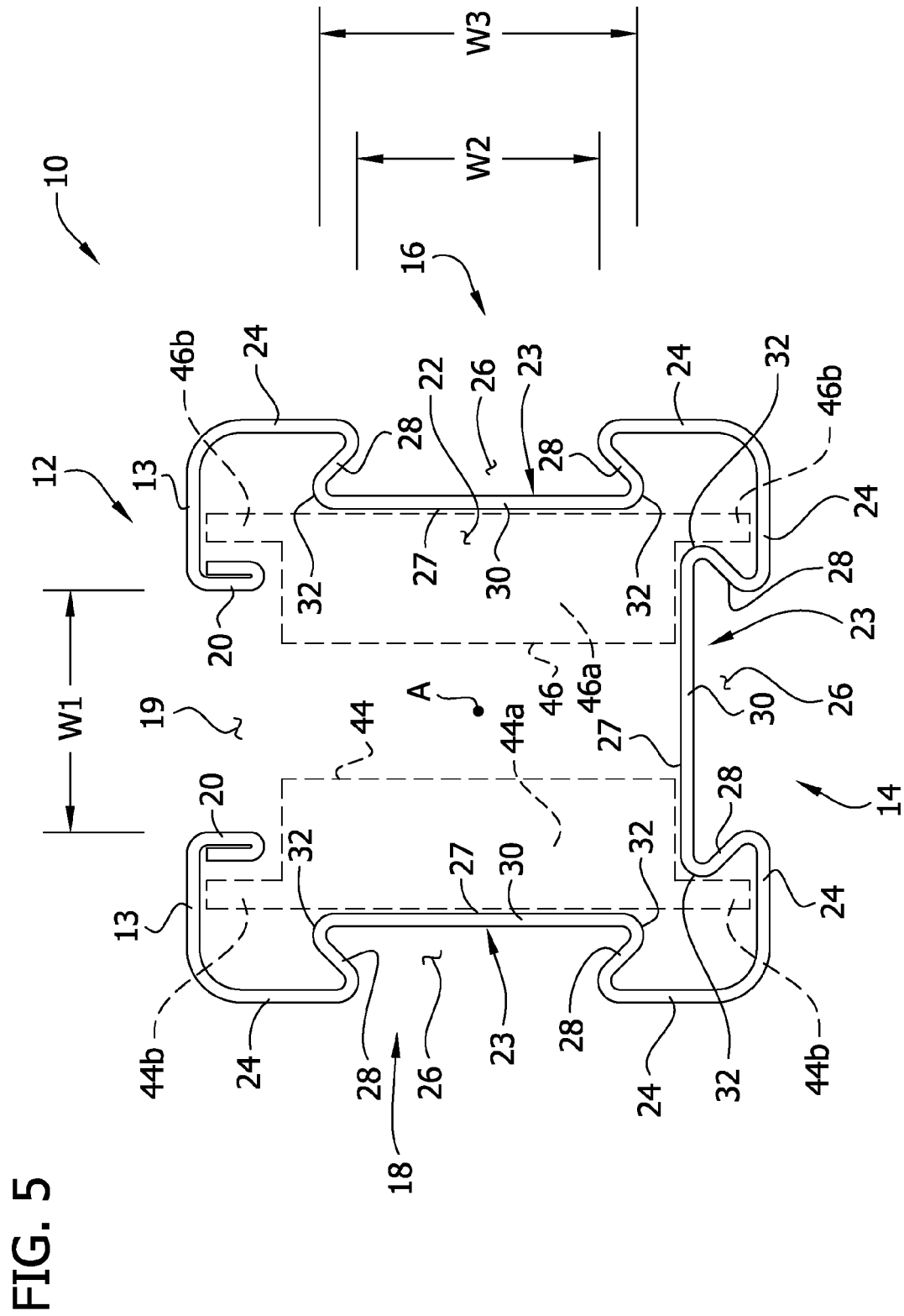
FIG. 5 is similar to FIG. 4, except with left and right T-shaped tracks defined by an interior of the channel framing being shown in broken lines.

One embodiment of the strut 10, for use in a strut system, is shown in FIGS. 3-5, which is similar to the embodiment shown in FIGS. 1 and 2. The strut 10 is elongate with a generally square or rectangular cross-sectional shape having four sides and a longitudinal axis A extending along its length and through opposite open longitudinal ends 10a of the strut 10. As illustrated, the strut has an upper side 12, a lower side 14, a right side 16, and a left side 18 (each indicated generally). As used throughout the present disclosure with respect to the strut 10, the terms defining relative locations and positions of structures and components of the strut, including but not limited to the terms "upper," "lower," "right," "left," "top," and "bottom," are meant to provide a point of reference for such components and structures when the strut is orientated as shown in FIGS. 3-5. (Accordingly, in FIGS. 1 and 2, for example, the strut is oriented "right-side up," relative to its orientation in FIGS. 3-5, such that the upper side 12 of the strut 10 is facing upward, and the lower side of the strut is facing downward. As explained below, the strut 10 may be oriented "up-side down" in other configurations.) Moreover, the terms "inner" and "outer" are relative locations with respect to the longitudinal axis A of the strut 10. The upper side 12 (or slot side) of the strut 10 defines a continuous opening or slot 19 (i.e., the upper side is open) having a width W1 (FIG. 4). The upper side 12 has outer portions 13 on either side of the slot 19, and inturned (or downwardly extending, as illustrated) lips 20 defining the slot and leading to an open interior 22 of the strut 10. The open longitudinal ends 10a also lead to the open interior 22 of the strut 10. The inturned lips 20 may be used in securing component fittings 23, such as pipe clamps, to the upper side of the strut 10 (see, e.g., FIGS. 11A and 11B). Suitable component fittings 23 for the slot 19 and inturned lips 20 are generally known in the art.

As illustrated, each of the lower, right and left sides 14, 16, 18, respectively, of the strut 10 has an inward portion, generally indicated at 23, and opposite outer portions 24 on either side of the inward portion, extending lengthwise of the strut 10. An exterior surface of the inward portion 23 defines an external fitting groove 26, and an interior surface of the inward portion defines an internal rail 23. Thus, the illustrated strut 10 includes respective left, right, and lower external fitting grooves 26 and corresponding left, right, and lower internal rails 23. Each inward portion 23 includes opposing side walls 28 extending generally inwardly from the respective ones of the outer portions 24 of the corresponding side 14, 16, 18, which form opposing external shoulders 29 at the junctions of the side walls and corresponding outer portion. The side walls 28 extend to a planar inner wall 30 that spans between and interconnects the side walls. The side walls 28 flare away from one another as they extend inward from the outer portions 24 toward the inner wall 30 so that each inward portion 23 has a generally dovetail cross-sectional shape or longitudinal end profile. It is understood that the inner portion 23, including one or both of the fitting groove 26 and the internal rail 23, may be of other shapes and configurations without departing from the scope of the present disclosure.

Referring to FIG. 3, the fitting grooves 26 may be substantially identical to one another, as illustrated. Each fitting groove 26 has a generally dovetail-shaped profile with a first relatively narrower width W2 (e.g., a minimum width) adjacent its entrance and a second relatively wider width W3 (e.g., a maximum width) adjacent the inner wall 30. In the illustrated embodiment, the fitting grooves 26 may be used for securing the strut fitting 11 to the strut, as explained in more detail below. The fitting grooves 26 may also be used to secure a component fitting 31, such as a pipe clamp to the strut 10. The component fitting, in turn, secures a component C (e.g., a pipe, electrical cable, cable tray, or the like) to the strut 10. The component fitting 31 may include a coupling component that is complementary to the fitting grooves 26 (e.g., a dovetail-shaped coupling component that can be inserted into the dovetail-shaped fitting groove) to secure the fitting to the strut 10. Suitable component fittings for the fitting groove 26 are disclosed in U.S. patent application Ser. No. 13/966,897, filed Aug. 14, 2013, the entirety of which is hereby incorporated by reference.

Each internal rail 23 has a generally dovetail-shaped profile with opposite internal shoulders 32 at the junctions of the inner wall 30 and the side walls 28. Accordingly, the left and right rails 27 have upper and lower internal shoulders 32, as shown in FIGS. 4 and 5, and the lower rail 27 has left and right internal shoulders 32, as illustrated. Referring to FIGS. 2 and 3, in the illustrated embodiment the interior 22 of the strut 10 has four (4) separate tracks, each of which has an effective T-shape in cross section (i.e., a "T-shaped track"). It is understood that the tracks may have other cross-sectional shapes. FIG. 2 includes a general outline (shown in broken line) of both a first T-shaped track 40 (e.g., an upper T-shaped track), defined by the inturned lips 20, and the upper shoulders 32 and inner faces (defined by the inner walls 30) of the respective left and right internal rails; and a second T-shaped track 42 (e.g., a lower T-shaped track), defined by the lower shoulders 32 and inner faces (defined by the inner walls 30) of the respective left and right internal rails 23, and the inner face (defined by the inner wall 30) of the lower internal rail. FIG. 3 includes a general outline (shown in broken line) of both a third T-shaped track 44 (e.g., a left T-shaped track), defined by the left inturned lip 20, the inner face (defined by the inner wall 30) of the left internal rail 23, and the left shoulder and inner face (defined by the inner wall 30) of the lower internal rail; and a fourth T-shaped track 46 (e.g., a right T-shaped track) defined by the right inturned lip 20, the inner face (defined by the inner wall 30) of the right internal rail 23, and the right shoulder and inner face (defined by the inner wall 30) of the lower internal rail. Each of the illustrated T-shaped tracks 40, 42, 44, 46 have a stem portion 40a, 42a, 44a, 46, respectively, and a crosswise portion(s) or wings 40b, 42b, 44b, 46b, respectively, extending generally transverse (e.g., perpendicular) to the corresponding stem portion.

In the strut 10 illustrated in FIGS. 3-5, openings 50 extend through each of the inner walls 30 of the inward portions 23 of the left, right, and lower sides 18, 16, 14, respectively. In other embodiments, the openings 50 may be in the lower side 14 and, only optionally, in the left and right sides 18, 16, respectively. For example, the strut 10 illustrated in FIGS. 1 and 2 has openings 50 in only the lower side 14 (i.e., the left and right sides 18, 16 are free from the openings. The openings 50 may be, for example, knockouts, or punched, or half-slots, or slots, as are generally known in the art. Typically, the openings 50 in the strut 10 will be the same type of opening, although the same strut may include a mix of different types of openings, such as shown in the illustrated embodiments. It is also understood that the sides may not include openings without departing from the scope of the present invention.

Figure 6:
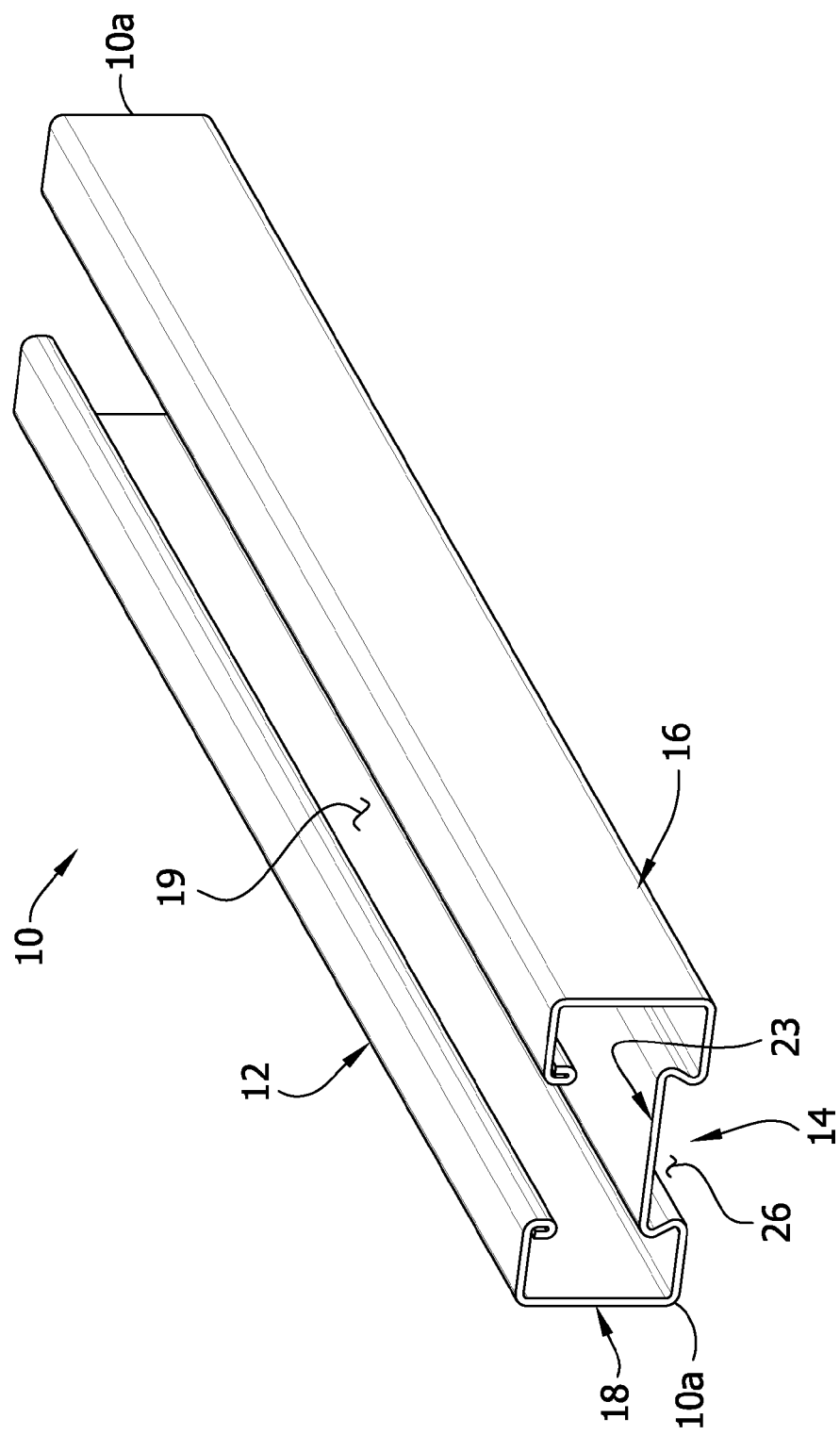
FIG. 6 is a perspective of another embodiment of strut for use in the trapeze hanger system.

Yet another embodiment of a strut suitable for use with the trapeze hanger system 6, and in particular the strut fitting 11, is indicated generally by the same reference numeral 10 in FIG. 6. Structures of the present strut 10 that are the same or similar to the structures of the strut embodiment illustrated in FIGS. 3-5 are indicated by corresponding reference numerals. This strut 10 is similar to the strut in FIGS. 3-5, except that the left and right sides 18, 16 have widths extending between the upper and lower sides 12, 14 that are less than the widths of the left and right sides of the embodiment shown in FIGS. 3-5. Moreover, the left and right sides 18, 16 of the present embodiment do not include the inward portions (or the grooves and internal rails), but instead, the left and right sides are generally planar. Thus, this strut 10 is substantially identical to the strut in FIGS. 1 and 2, other than the strut does not include openings in the lower side 14 or other sides 16, 18.

In one example, the strut 10 may be formed from a sheet of rigid metal, such as low carbon steel, stainless steel, aluminum, or other metals, or from other material, such as fiberglass or plastic. The strut 10 may be cold formed using a rolling mill, such as when forming the strut from steel, or the strut may be extruded from an extrusion die, such as when forming the strut from aluminum. The strut 10 may be formed in other ways. The strut 10 may be formed from a metal sheet having uniform thickness from about 0.5 mm to about 4 mm. In one non-limiting example, the strut 10 may be formed from 18 gauge (1.2 mm) steel sheet metal, or from 20 gauge (0.9 mm) steel sheet metal. In another non-limiting embodiment, the dimension of each of the width and height of the strut 10 may be 53.5 mm, as opposed to 50 mm.

Figure 12A:
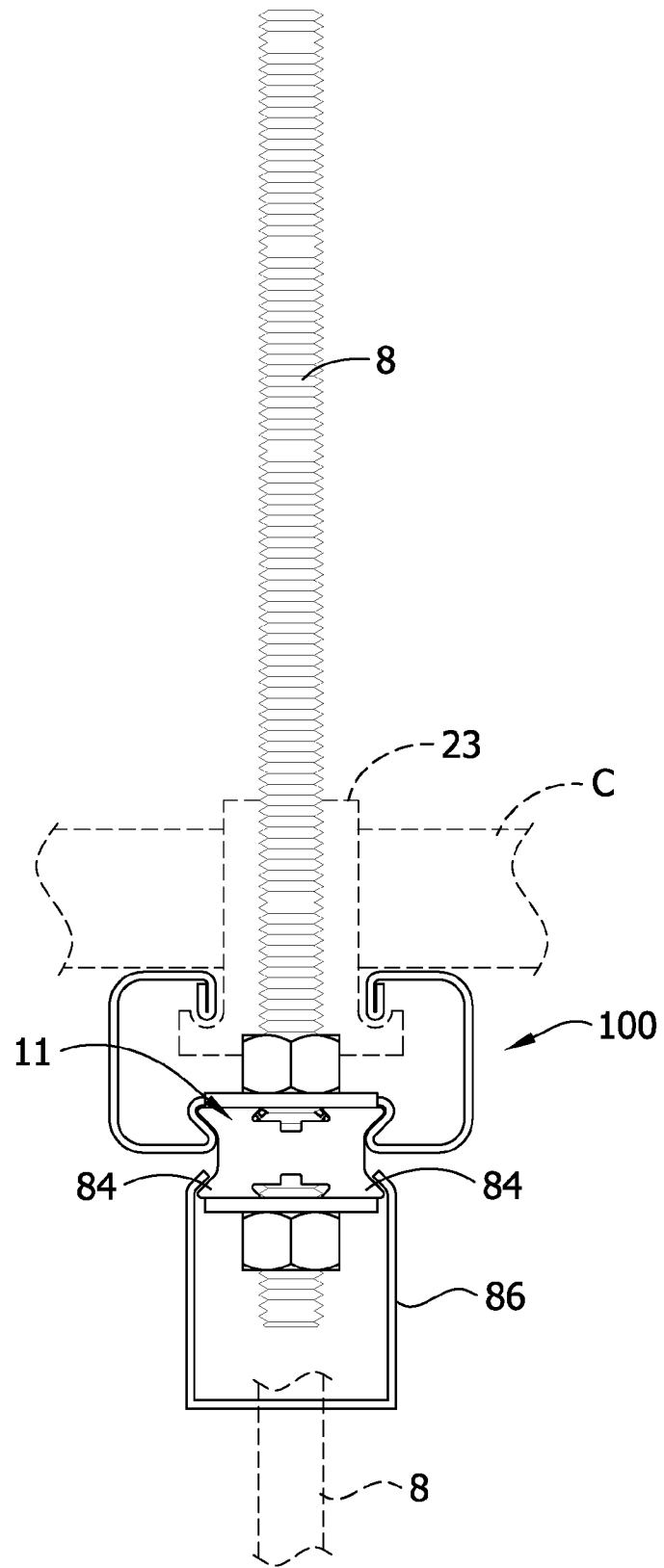
FIG. 12A is a side elevation of the assembled strut system of FIG. 11A.

Referring to FIGS. 7-10, the strut fitting 11 comprises an elongate body, generally designated 72, that is generally in the form of a bar or block. The body 72 has opposite faces 74, opposite sides 76, and a length L1 (FIG. 9) extending between opposite ends 78. The body 72 has double or dual dovetail cross-sectional shape corresponding generally to the shape of opposing fitting grooves 26 when two pieces of channel framing 10 are arranged side-by-side, as shown in FIGS. 15-18, for example. In other embodiments, the body 72 may have a single dovetail cross-sectional shape generally corresponding to the shape of a single fitting groove 26. The body 72 is sized and shaped for sliding in an open end of the fitting groove(s) 26 at either longitudinal end 10a of the strut 10. In particular, each side 76 defines a groove 82 extending along the length of the body 72. As such, the body 72 has opposing flanges 84 (see FIG. 10) at each side 76 of the strut fitting extending along the length L1 of the body. As shown in FIGS. 11A and 12A, secondary component fittings 86 may be secured to the flanges 84 at opposite sides 76 of the strut fitting 11 when the strut fitting is secured to the strut 10. For example, component fittings 86 having a complementary dovetail shape can be secured to (e.g., mate with) the exposed portion of the strut fitting 11, or a component fitting can include clamp or clip arms that clamp or clip onto the flanges 84. This allows additional components (e.g., pipes, cables, or other components) to be secured to the strut using the strut fitting 11. For example, in FIGS. 11A and 12A, secondary rods 8 are secured to the secondary component fitting 86, whereby a secondary strut 10 can be hung from the secondary rods for supporting components in the same manner as the first strut.

Figure 12B:
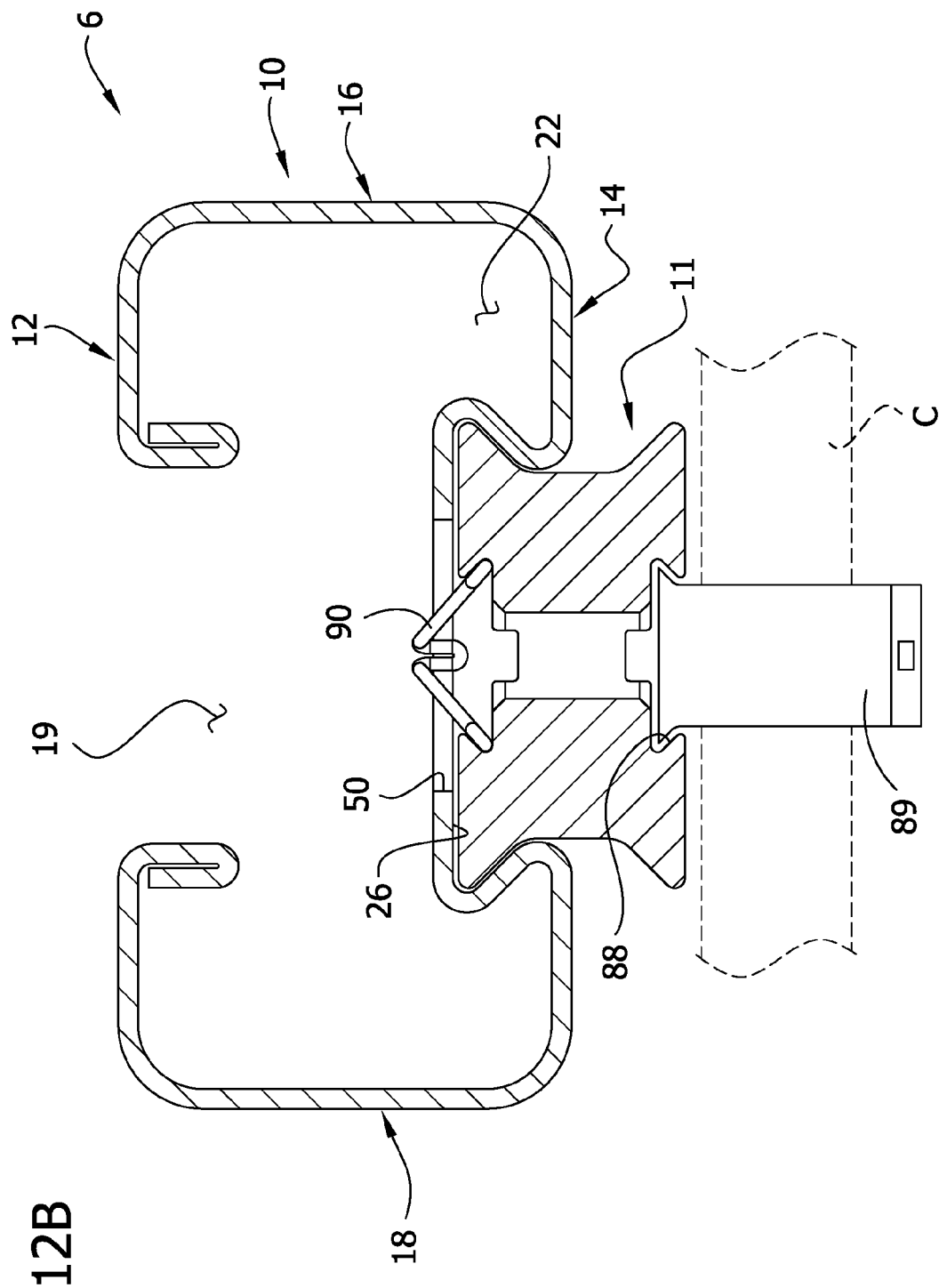
FIG. 12B is a side elevation of the assembled strut system of FIG. 11B.
Figure 13:
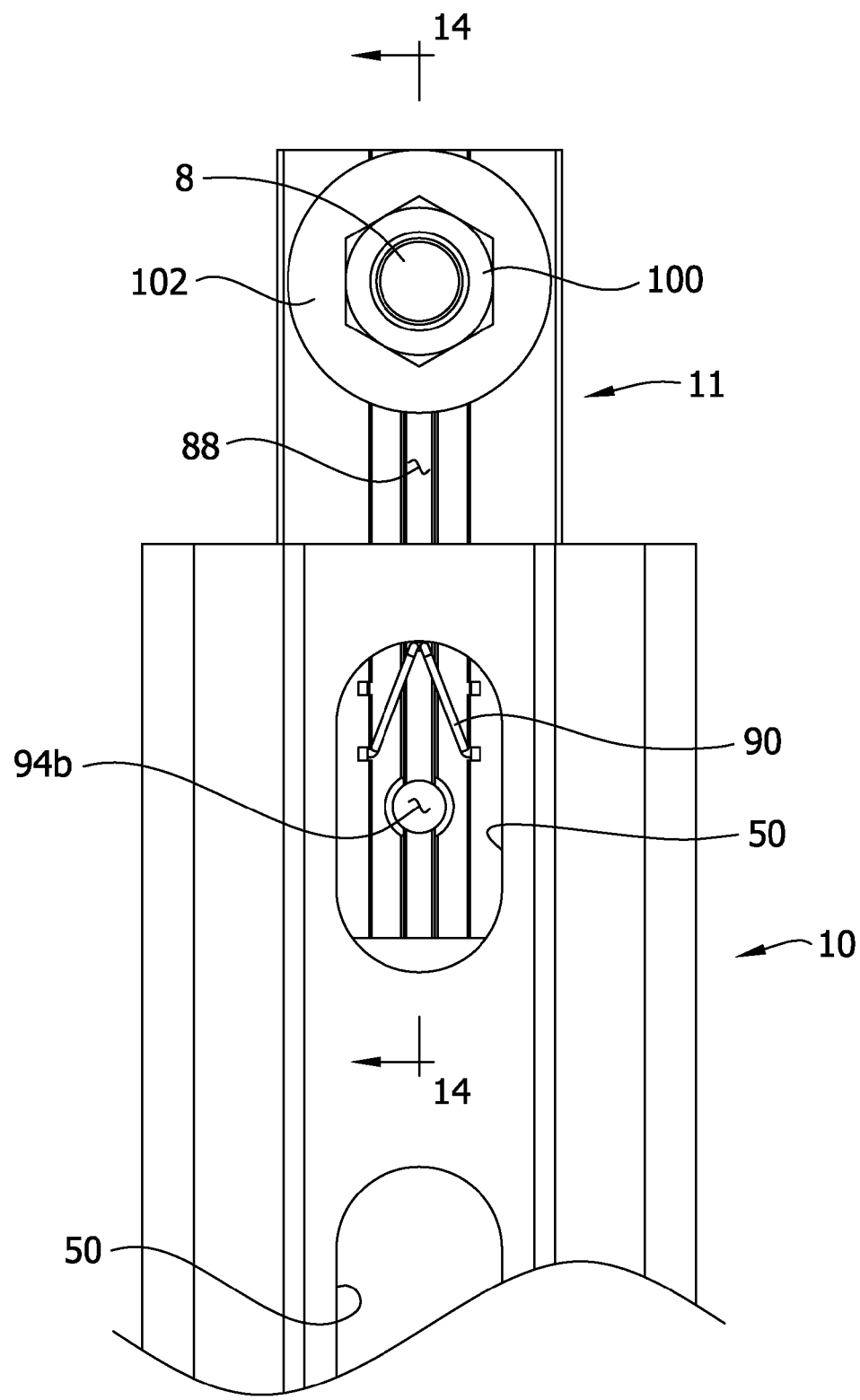
FIG. 13 is a partial, top plan of the assembled strut system of FIG. 1.
Figure 14:
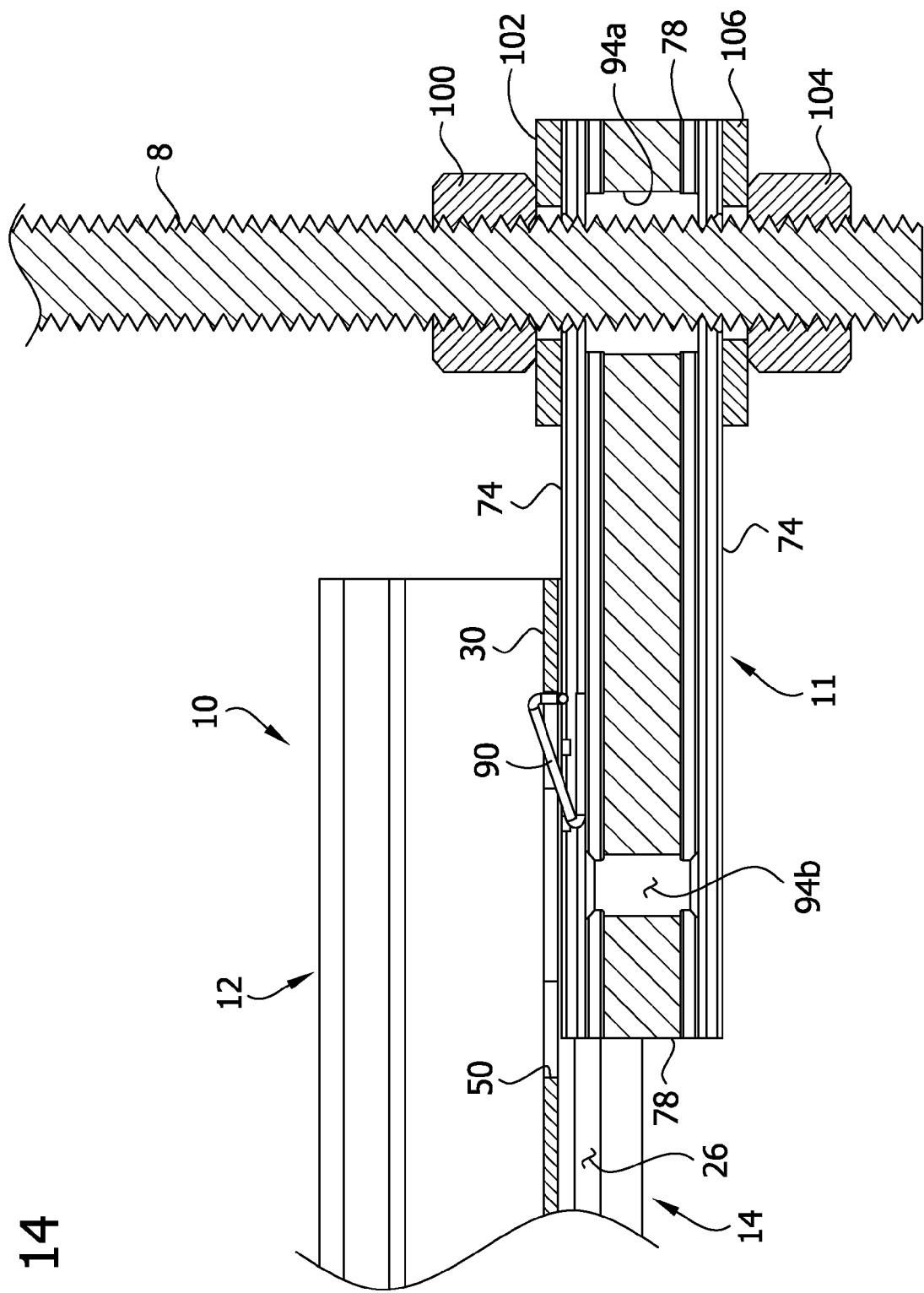
FIG. 14 is a sectional view of the assembled strut system taken through the line 14-14 of FIG. 13.
Figure 15:
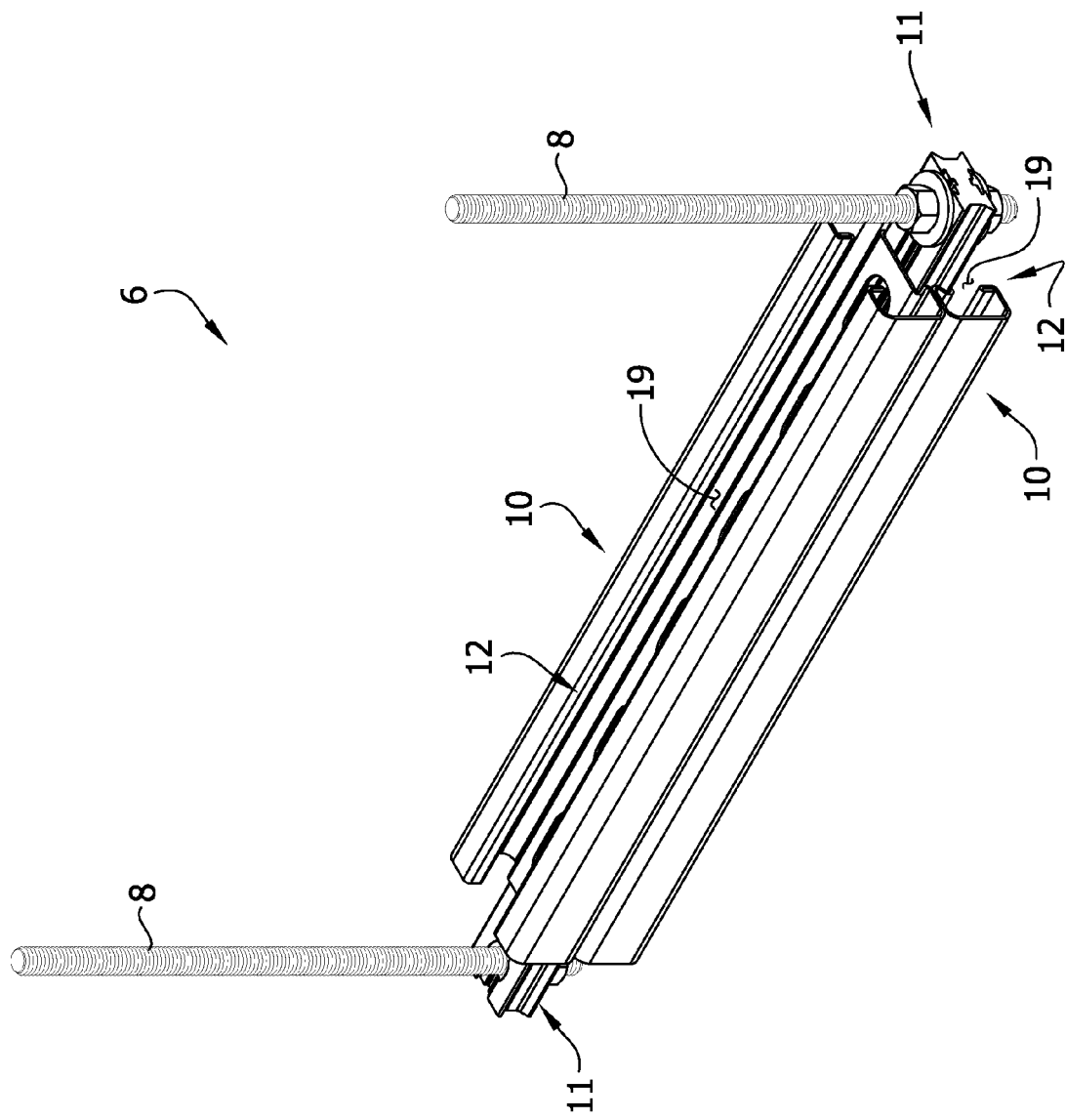
FIG. 15 is a perspective of another embodiment of a strut system, including two struts secured side-by-side to one another using the strut fitting.
Figure 16:
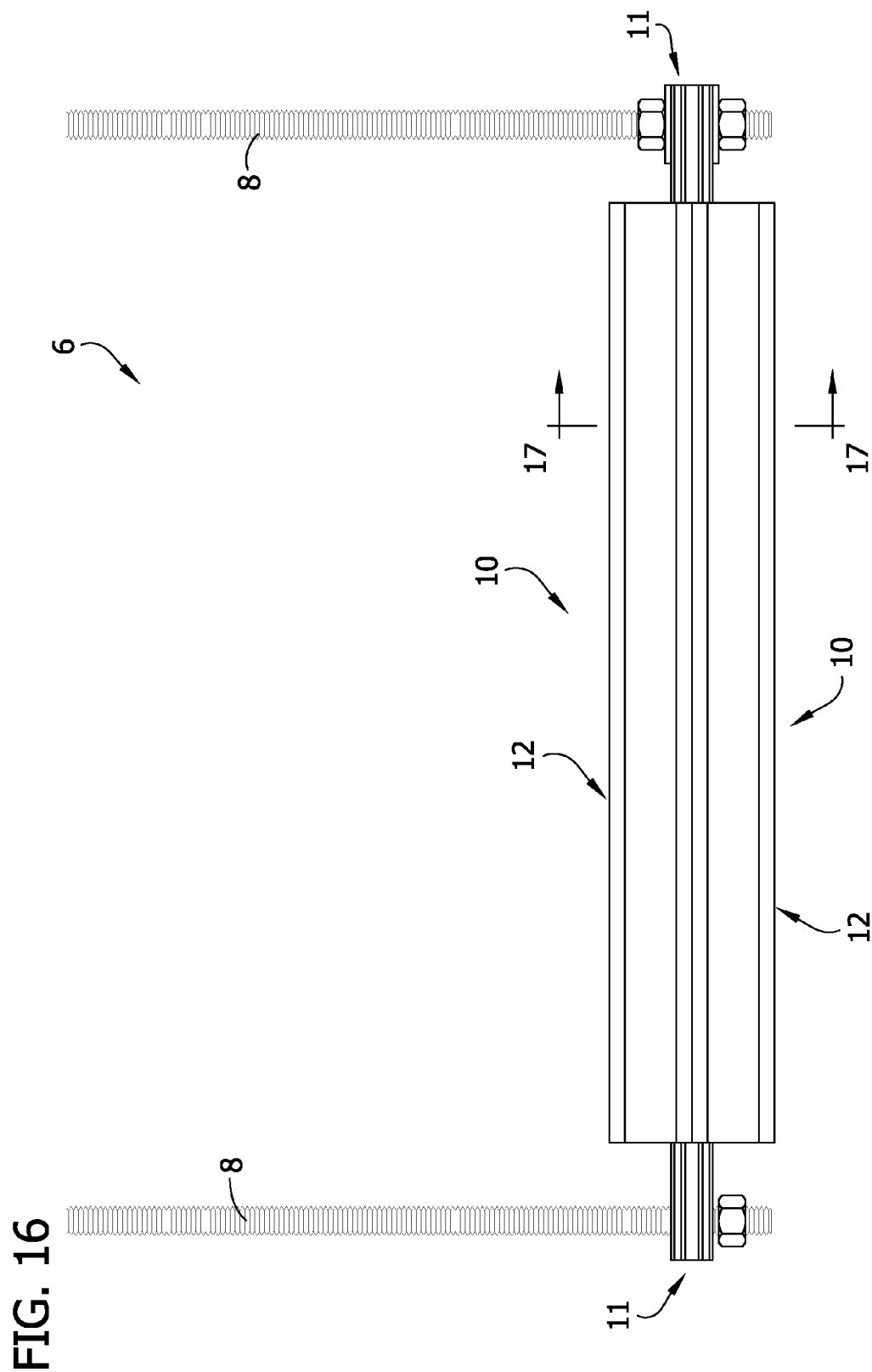
FIG. 16 is a side elevation of the assembled strut system of FIG. 15.
Figure 17:
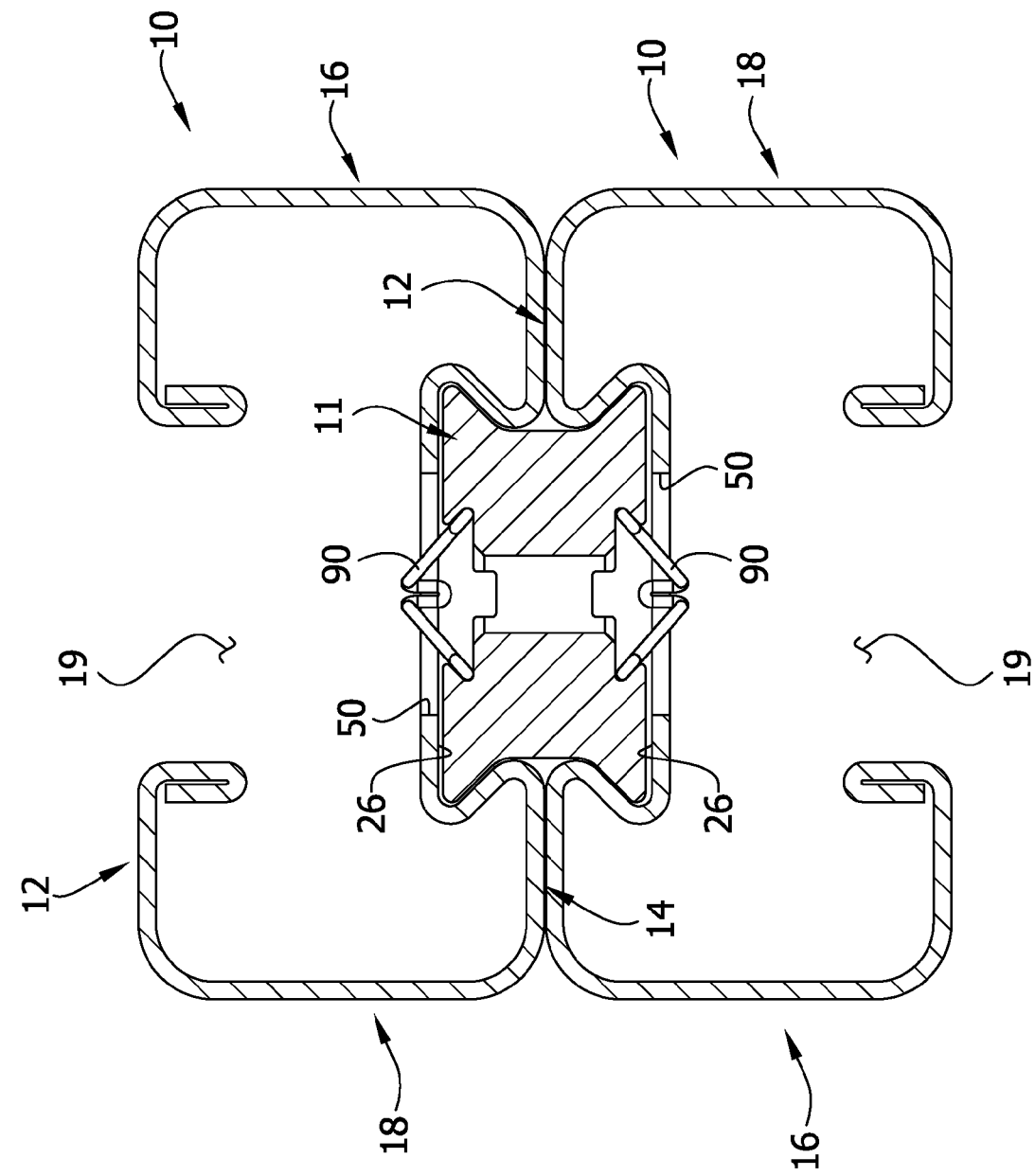
FIG. 17 is a sectional view of the strut system taken through the line 17-17 in FIG. 16, the rod and associated nuts and washers being removed for ease of illustration.
Figure 18:
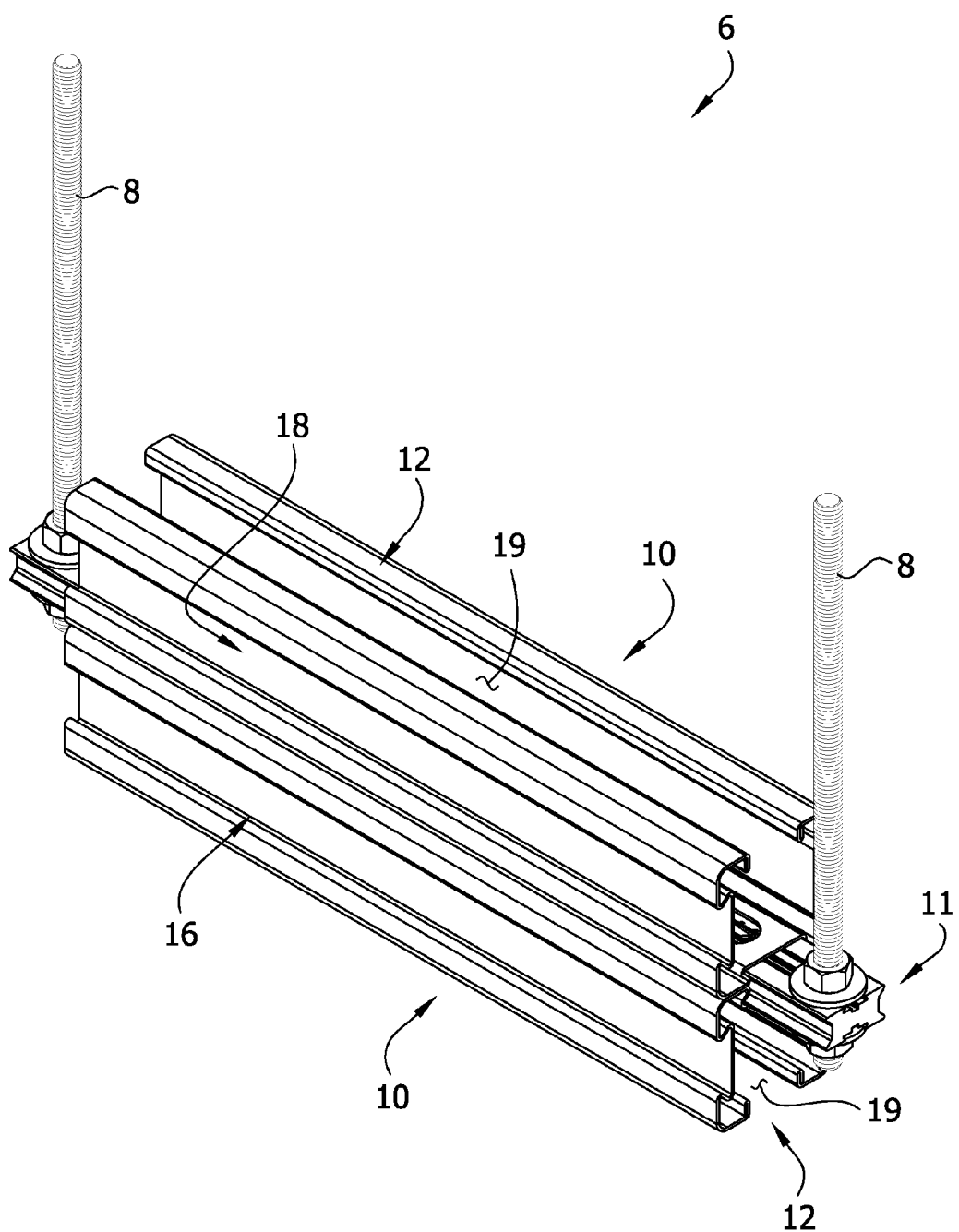
FIG. 18 is a perspective of another embodiment of an assembled strut system, similar to the strut system of FIG. 15, except including a different strut embodiment.

Referring still to FIGS. 7-10, each face 74 defines a groove 88 extending along the length L1 of the body 72. In the illustrated embodiment, each groove 88 has a generally dovetail-shaped profile with a first relatively narrower width W4 (e.g., a minimum width) adjacent the corresponding face 74 and a second relatively wider width W5 (e.g., a maximum width) inward of the face. In the illustrated embodiment (FIGS. 11B and 12B), the grooves 88 may be used for securing a component fitting 89 (e.g., a secondary component fitting), such as a pipe clamp (or other fitting) to the strut fitting 11. The secondary component fitting 89, in turn, secures a component C (e.g., a pipe, electrical cable, cable tray, or the like) to the strut 10. The component fitting 89 may include a coupling component that is complementary to the groove 88 (e.g., a dovetail-shaped coupling component that can be inserted into the dovetail-shaped groove) to secure the secondary component fitting to the strut fitting 11. In particular, the groove 88 may be complementary to the fitting groove 26 of the strut 10 in that it is of the same general shape, except with smaller dimensions. Thus, suitable secondary component fittings for the groove 88 are disclosed in U.S. patent application Ser. No. 13/966,897, filed Aug. 14, 2013, the entirety of which is hereby incorporated by reference.

In the illustrated embodiment, at least one catch 90 (e.g., a spring) is secured within at least one of the grooves 88. In a relaxed state, the catch 90 extends out of the corresponding groove 88 (i.e., passes through the plane defined by the corresponding face 74) so that a portion of the catch is exposed outside the fitting body 72. The exposed portion of the catch 90 is resiliently deflectable toward the corresponding face 74 (i.e., into the groove 88). In use, as the strut fitting 11 is inserted into one or more fitting grooves 26 of one or more strut 11, the exposed portion of the catch 90 engages the inner wall 30 partially defining the fitting groove and resiliently deflects toward the corresponding face 74 and into the groove to allow insertion of the strut fitting 11 into the groove(s). As the exposed portion of the catch 90 moves past a peripheral edge of one of the openings 50, the catch pivots away from the corresponding face 74 (i.e., rebounds to its initial position) and enters the opening. When the catch is received in one of the openings 50 and is in its initial position, the exposed portion of the catch 90 will catch or engage the peripheral edge of the corresponding opening if a withdrawal force is applied to the strut fitting 11, thereby inhibiting unintentional disconnection of the strut fitting 11 and the strut 10. To disconnect the strut fitting 11 from the strut 10 when the catch 90 received in one of the openings 50, the catch can be resiliently deflected by pressing down on the free end of the catch and simultaneously applying a withdrawal force to the strut fitting, thereby sliding the strut fitting out of the fitting groove 26.

Figure 7:
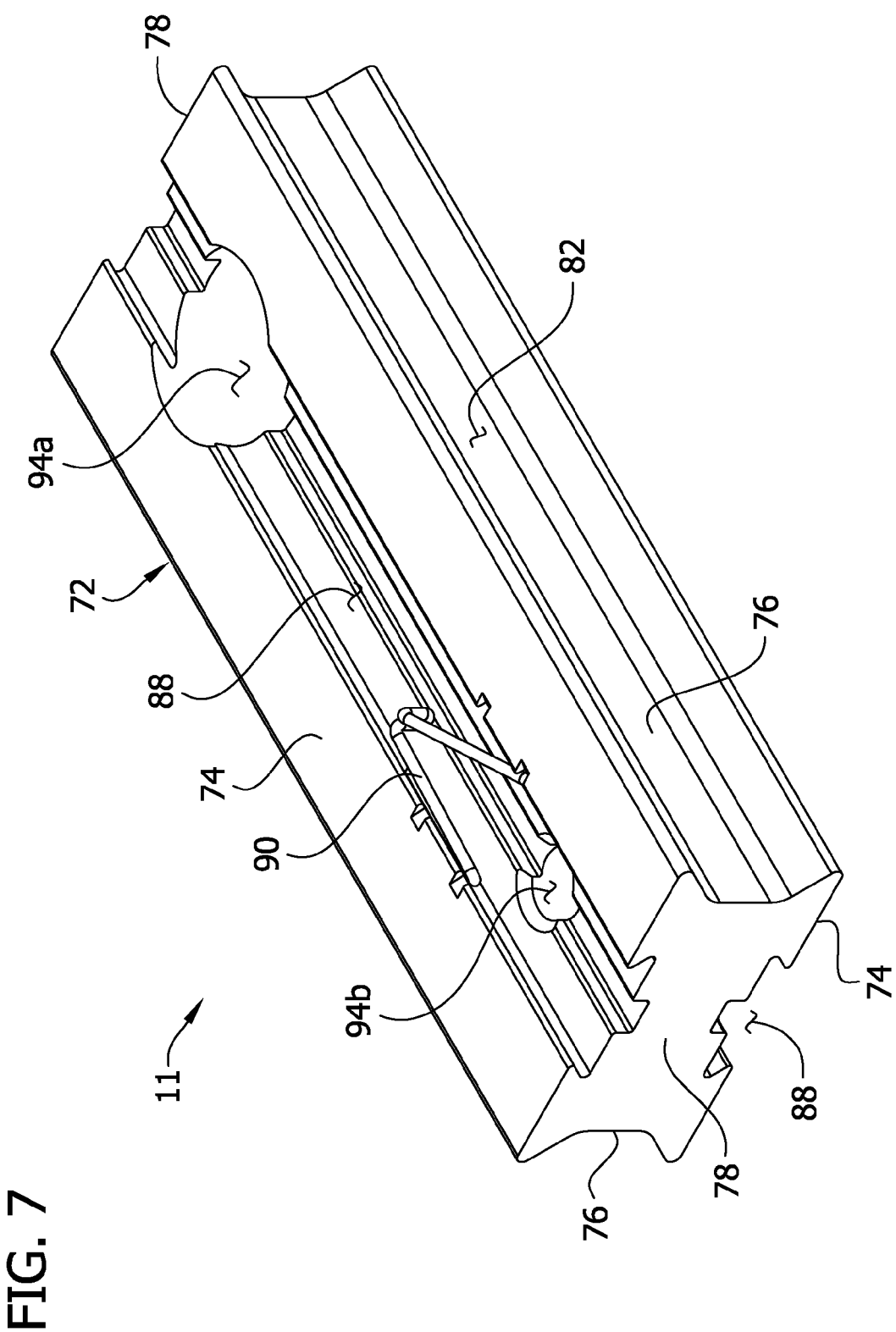
FIG. 7 is a perspective of the strut fitting for use in the strut system.
Figure 8:
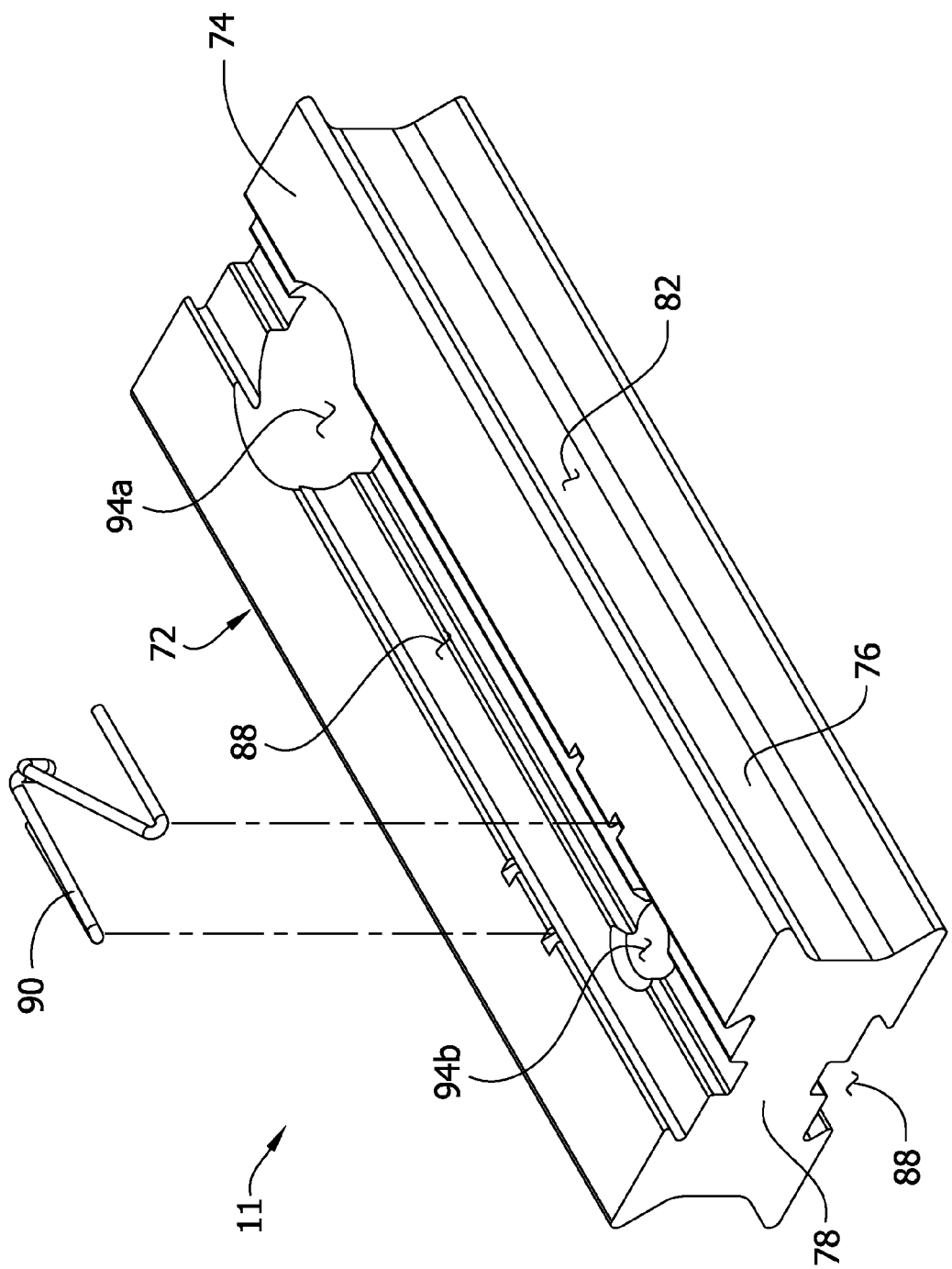
FIG. 8 is an exploded view of the strut fitting.
Figure 9:
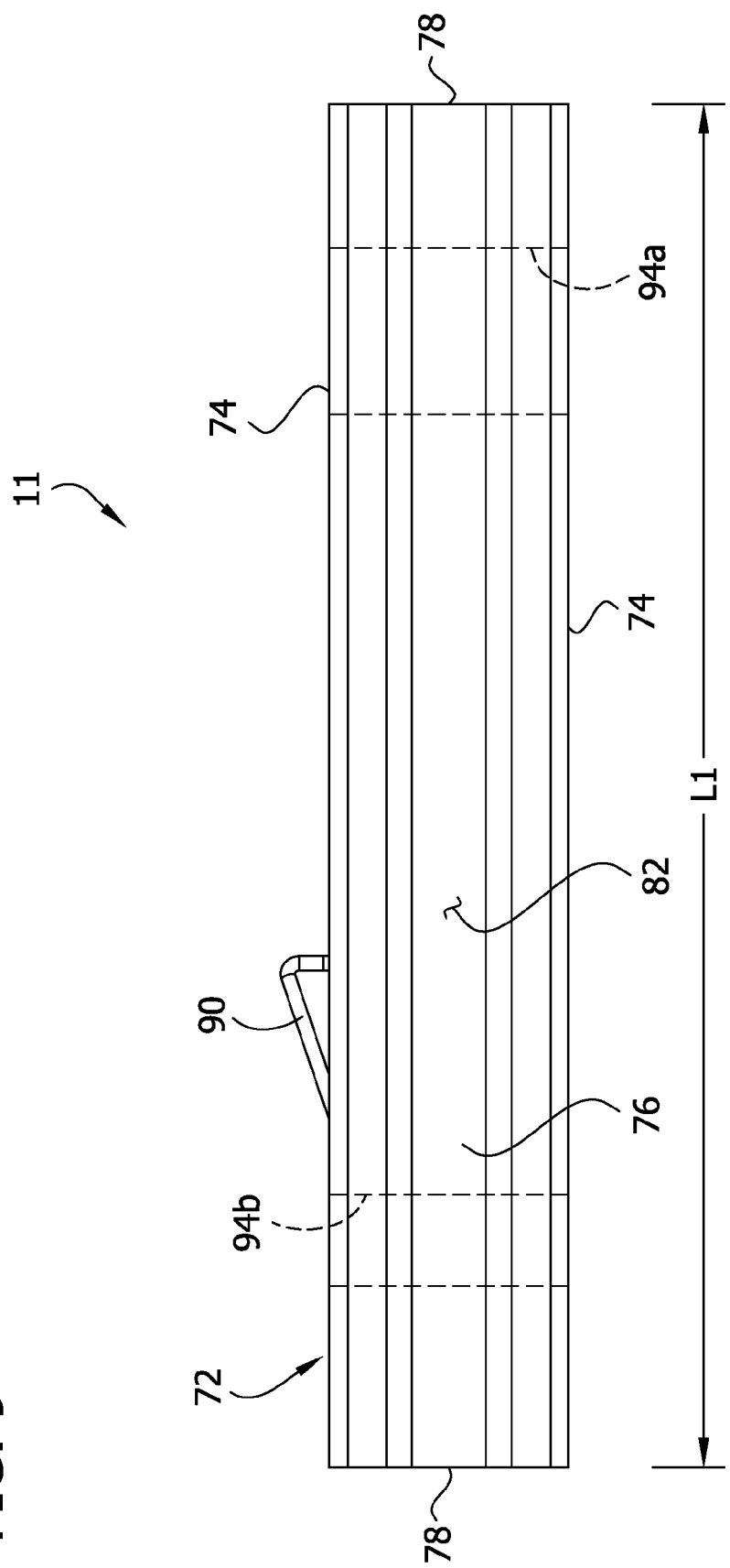
FIG. 9 is a side elevation of strut fitting.
Figure 10:
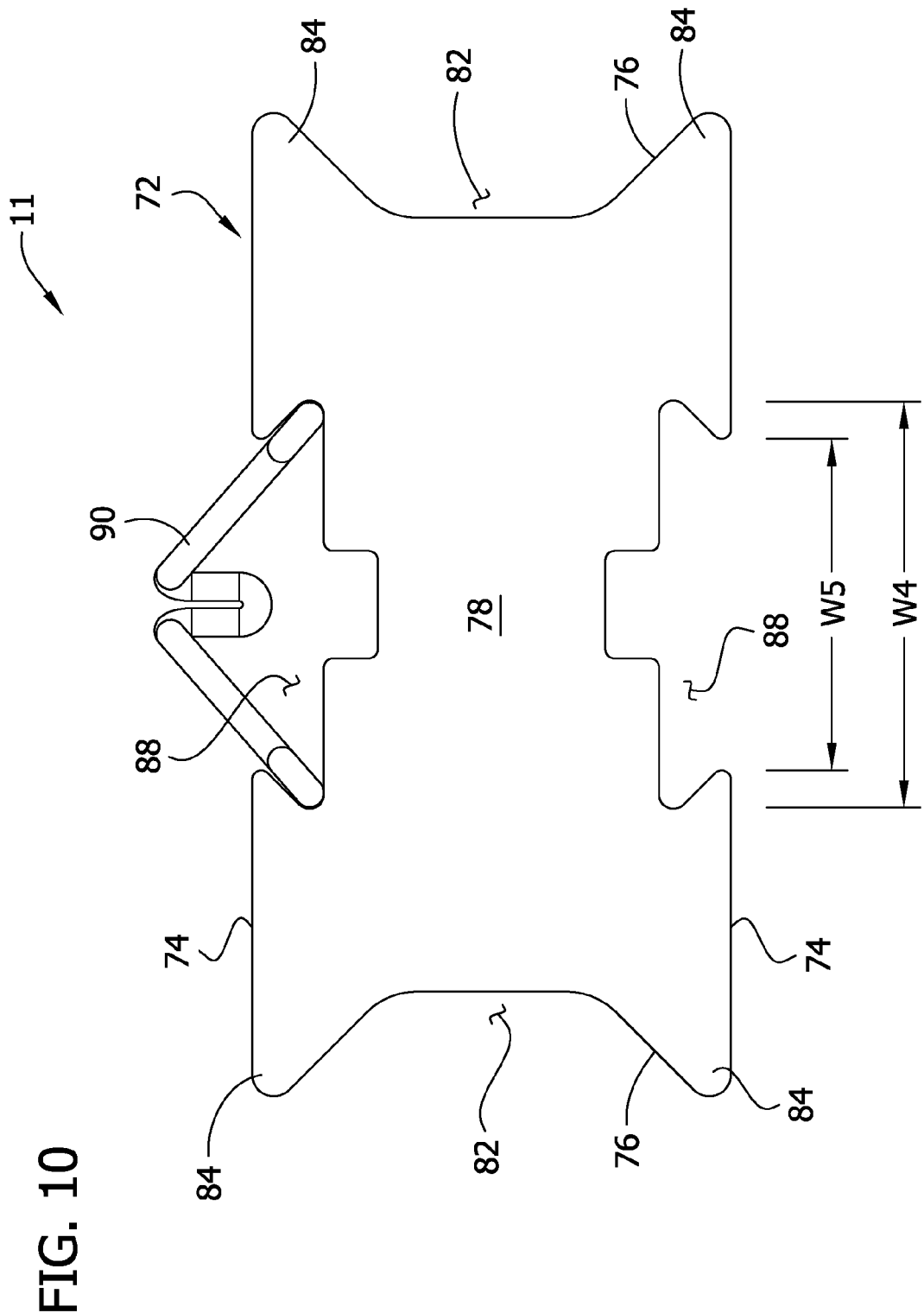
FIG. 10 is front elevation of the strut fitting.

One or more openings (e.g., first and second openings 94a, 94b in the present embodiment) extend through the opposite faces 74 of the fitting body 72. These openings 94a, 94b may by through openings (e.g., non-threaded) and sized and shaped to receive the threaded rods 8 therethrough. In the illustrated embodiment, the first opening 94a is sized and shaped to receive a larger diameter rod(s) 8 (e.g., a 0.500 in. and 0.625 in. diameter rods for heavier duty applications), and the second opening 94b is sized and shaped to receive a smaller diameter rod(s) (e.g., 0.25 in. and 0.375 in diameter rods for lighter duty applications). Each opening 94a, 94b is adjacent one of the respective ends 78 of the fitting body 72. Accordingly, either opening 94a, 94b may be exposed outside the strut 10 (e.g., laterally outward from the longitudinal end 10a of the strut) and used to secure the strut fitting 11 to the strut, depending on which end 78 of the fitting body 72 is inserted into the fitting groove 26. Moreover, the catch 90 may be orientated in the groove 88 of the fitting body 72 in two directions to accommodate the orientation (or anticipated orientation) of the strut fitting 11 in the fitting groove 26. For example, as shown in FIG. 7, when the strut fitting 11 is to be inserted into the fitting groove 26 such that the first opening 94a is exposed outside the strut 10, the catch 90 is orientated in the groove 88 such that the exposed portion of the catch extends toward the first opening and the end 78 of the fitting body 72 adjacent the first opening. However, when the strut fitting 11 is to be inserted into the fitting groove 26 such that the second opening 94b is exposed outside the strut 10, the catch 90 is orientated in the groove 88 such that the exposed portion of the catch extends toward the second opening and the end 78 of the fitting body 72 adjacent the second opening.

As shown in FIGS. 1 and 2, the strut fitting 11 may be used to suspend the strut 10 a ceiling or other elevated structure. In one embodiment, a method of hanging the strut 10 from a ceiling or other elevated structure includes inserting a pair of the strut fittings 11 into one of the fitting grooves 26 of the strut so that longitudinal ends of the strut fittings extend outward from opposite open ends of the grooves 26, and in particular, so a selected one of the openings 94a, 94b in each strut fitting is accessible. As the strut fittings 11 are inserted into the fitting groove 26, the catches 90 resiliently deflect and then rebound into one of the openings 50 to secure the strut fitting to the strut, as described above. Next, the rods 8 can be inserted through the selected (i.e., exposed) one of the openings 94a, 94b in the respective strut fittings 11. As shown in FIG. 2, a first nut 100 (e.g., an upper nut) may be threaded on each rod 8 before the rod is inserted through the selected opening 94a, 94b. A first washer 102 may be disposed between the first nut and the corresponding side 74 (e.g., the upper side) of the strut fitting 11. After inserting the rod 8 into the selected opening 94a, 94b, a second washer 106 may be received on the rod and a second nut 104 may be threaded on the rod such that the second washer and the nut oppose the opposite face 74 of the strut fitting 11. The first and second nuts 100, 104 may be rotated on the rod 8 to adjust the height of the strut 10 on the rod. The nuts 100, 104 are then tightened to sandwich the strut fitting between the nuts. Other methods of hanging the strut 10 using the strut fittings 11 do not depart from the scope of the present invention. For example, the left rod 8 in FIG. 1, for example, has a single lower nut 104 securing the strut fitting 11 to the rod.

Referring to FIGS. 15-18, in one embodiment the strut fitting 11 may be used as an insert to connect two pieces of strut 10 side-by-side. In use, the strut fitting 11 may be used to both connect strut 10 to the rod (as described above) and to connect two pieces of strut side-by-side (as illustrated), or the strut fitting may be used to perform one function and not the other. For connecting two pieces of strut 10 side-by-side, the strut fitting 11 is inserted into two opposing fitting grooves 26 of two side-by-side pieces of strut. In one embodiment, each face 74 of the strut fitting 11 may include the catch 90 to lock the strut fitting to both of the struts 10 when the strut fitting is inserted into the respective fitting grooves 26. Additional pieces of strut 10 may be connected using one or more additional similar strut fittings 11. Other ways of securing the strut fitting 11 to the strut 10 for connecting two pieces of strut side-by-side do not depart from the scope of the present invention.

Figure 19:
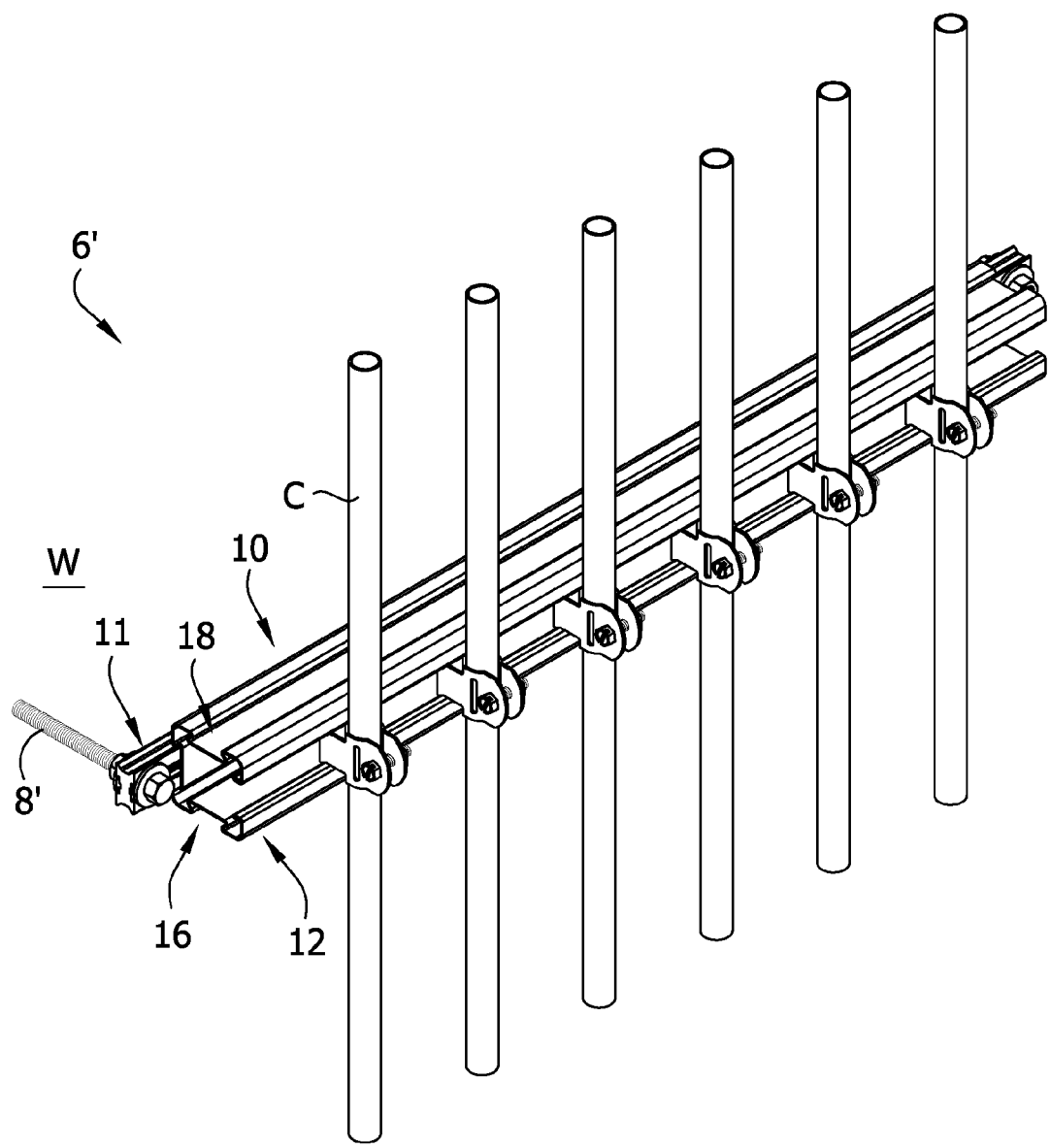
FIG. 19 is a perspective of another embodiment of an assembled strut system in the form of a wall-mount system.
Figure 20:
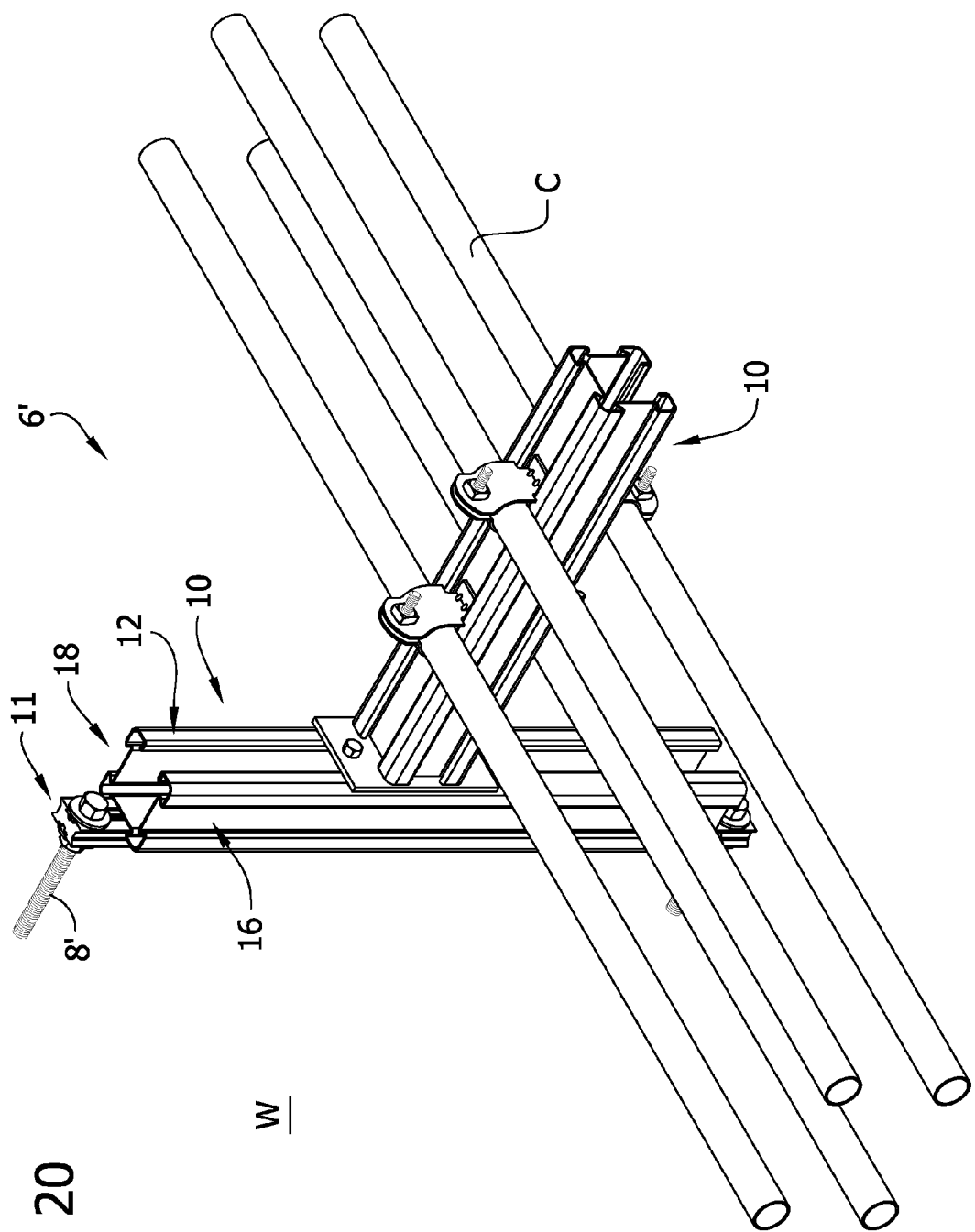
FIG. 20 is another embodiment of a wall-mount system.

As shown in FIGS. 19 and 20, the strut fitting 11 may be used as part of a wall-mount system, generally indicated at 6', to secure the strut 10 to a wall W. This wall-mount system 6' is similar to the trapeze hanger system 6, other than instead of rods 8 suspended from a ceiling or other elevated structure, fasteners 8' (e.g., bolts) extend through the exposed selected openings 94a, 94b in the strut fittings 11 and into the wall W. Thus, the strut fittings 11 are secured to the strut 10 in the same manner as the trapeze hanger system 6. In the configuration in FIG. 19, the strut 10 is orientated generally horizontally on the wall with the open slot side 12 facing outward from the wall W such that components C may be secured to the strut in the same manner as with the trapeze hanger system (e.g., using conventional component fittings). In another configuration shown in FIG. 20, the strut 10 is orientated generally vertically on the wall W with the open slot side 12 facing outward from the wall. A second piece a strut 10 secured to the first strut mounted on the wall W projects outward (e.g., is cantilevered) from the first strut in a generally horizontal orientation. Components C may be secured to the horizontal second strut 10 in the same manner as with the trapeze hanger system (e.g., using conventional component fittings and component fittings with dovetail coupling components for insertion into the fitting grooves 26).

Figure 21:
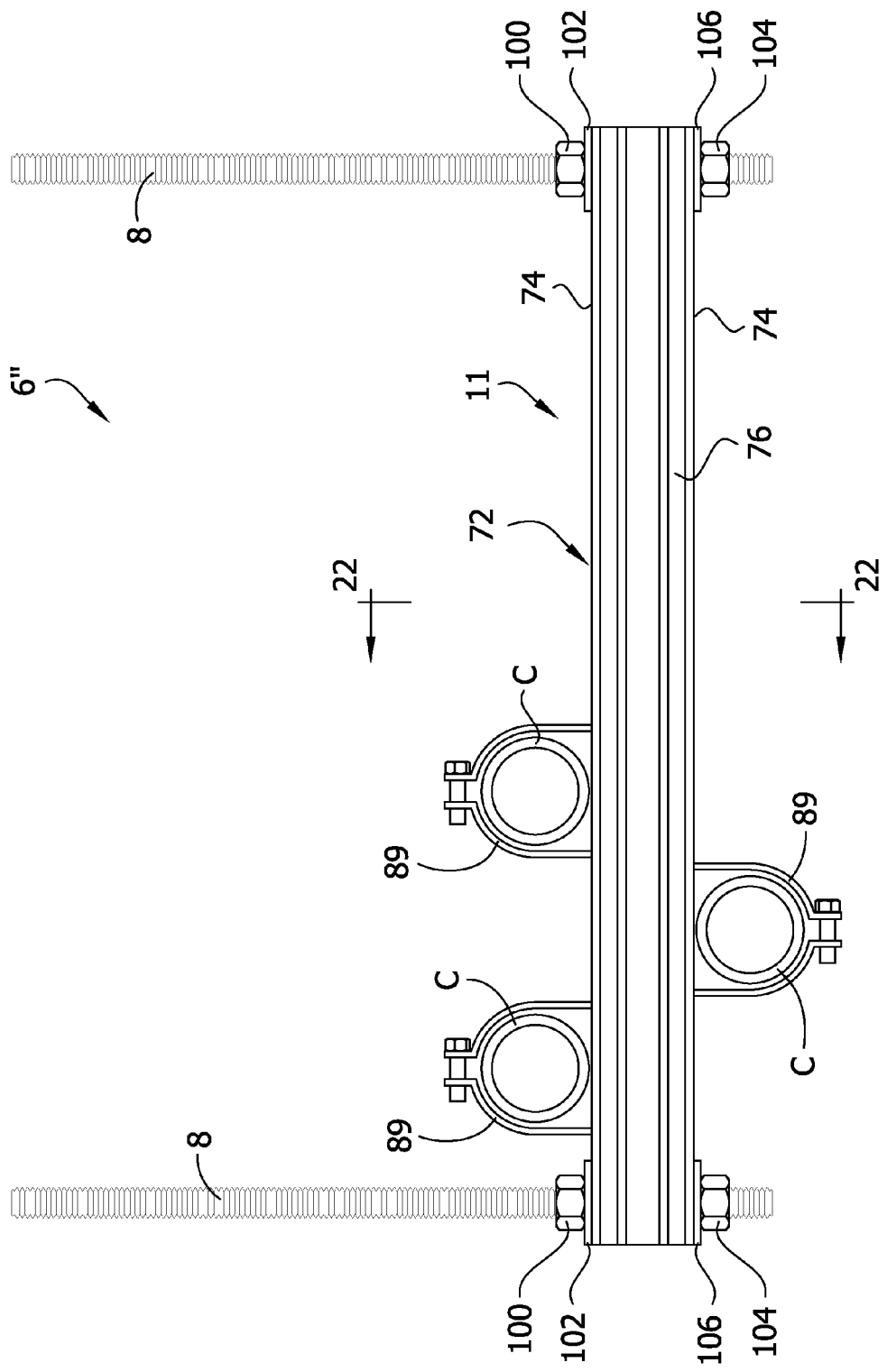
FIG. 21 is another embodiment of a strut system, including a strut fitting secured to a pair of threaded rods, and components secured to the strut fitting using component fittings.
Figure 22:
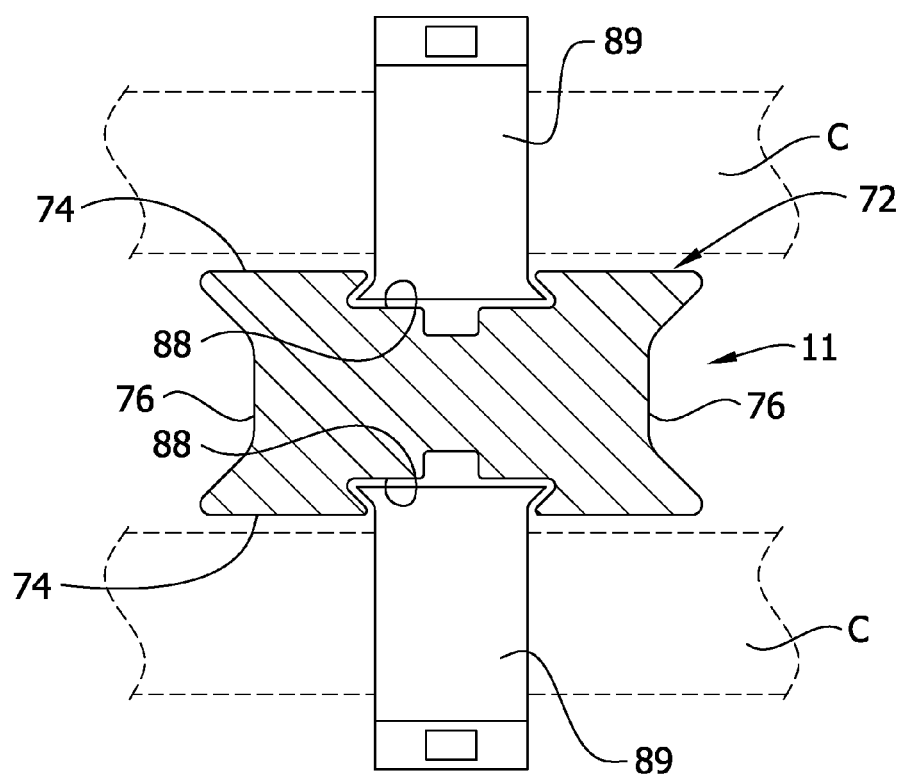
FIG. 22 is a side elevation of the assembled strut system of FIG. 21.

Referring to FIGS. 21 and 22, in another embodiment the strut fitting 11 itself may be used as the support structure (similar to the strut 10 of the previous embodiments), whereby the strut is omitted and components are mounted on the strut fitting. In the illustrated embodiment, the strut fitting 11 is part of a trapeze hanger system 6" including rods 8 secured to the strut fitting by inserting the rods through each of the opposite openings 94a, 94b. Nuts and washers may be used the same manner as the previous embodiment to secure the strut fittings 11 to the rods 8. In this embodiment, it is preferred that the opposite openings 94a, 94b are identical for receiving identical rods 8, rather than being adapted to receive different sized rods as in the previous embodiment. The grooves 88 in the opposite faces 74 of the strut fitting 11 can be used to connect the component fittings 89 thereto, which in turn, are used to secure components C to the strut fitting. As can be understood through the teachings of this disclosure, the strut fitting 11 may also be used in a wall-mount system (not shown) in a similar manner.

Having described embodiments of the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A strut fitting for a strut having at least one side defining a dovetail-shaped groove, the strut fitting comprising:
    a fitting body having opposite ends, a length extending between the opposite ends, first and second opposite faces extending along the length of the body, and opposite sides disposed between the first and second faces and extending along the length of the body, wherein the first face and at least portions of the opposite sides adjacent the first face define a first cross-sectional shape of the fitting body that is generally dovetail-shaped; and
    a catch secured to and extending outward from the first face of the fitting body, wherein the catch is resiliently deflectable relative to the fitting body,
    wherein the catch is resiliently deflectable toward the first face of the fitting body,
    wherein the first face of the fitting body defines a groove extending along the length of the body, the resiliently deflectable catch secured in the groove defined by the first face and protruding outward from the groove.

2. The strut fitting set forth in claim 1, wherein the catch is resiliently deflectable about an axis such that the catch is resiliently pivotable toward the first face of the fitting body.

3. The strut fitting set forth in claim 1, wherein the catch comprises a spring.

4. The strut fitting set forth in claim 1, wherein the second face and portions of the opposite sides adjacent the second face define a second cross-sectional shape of the fitting body that is generally dovetail-shaped.

5. The strut fitting set forth in claim 1, wherein the second face of the fitting body defines a groove extending along the length of the body.

6. The strut fitting set forth in claim 5, wherein the groove of the second face of the fitting body has a cross-sectional shape that is generally dovetail-shaped.

7. The strut fitting set forth in claim 5, wherein the second face and at least portions of the opposite side adjacent the second face define a second cross-sectional shape of the fitting body that is generally dovetail-shaped.

8. The strut fitting set forth in claim 1, wherein the fitting body defines a through opening extending through the first and second faces, wherein the through opening is sized and shaped for receiving a rod therein.

9. The strut fitting set forth in claim 8, wherein the through opening comprises first and second through openings spaced apart from the one another along the fitting body.

10. The strut fitting set forth in claim 9, wherein first through opening has a diameter greater than a diameter of the second through opening.

11. The strut fitting set forth in claim 1, in combination with the strut having at least one side defining a dovetail-shaped groove, wherein the first cross-sectional shape of the fitting body is sized and shaped for sliding reception in the dovetail-shaped groove of the strut.

12. The strut fitting in combination with the strut set forth in claim 11, wherein the catch is configured to resiliently deflect as the first cross-sectional shape of the fitting body is slidingly received in the dovetail-shaped groove of the strut.

13. The strut fitting in combination with the strut set forth in claim 11, wherein the dovetail-shaped groove of the strut defines an opening in communication with an interior of the strut,
    wherein the first cross-sectional shape of the fitting body is received in the dovetail-shaped groove of the strut,
    wherein the catch is received in the opening of the dovetail-shaped groove of the strut to restrict sliding of the strut fitting along the dovetail-shaped groove of the strut.

14. The strut fitting in combination with the strut set forth in claim 11, in further combination with a threaded rod, wherein the fitting body defines a through opening extending through the first and second faces, wherein the threaded rod is received in the through opening and secured to the strut fitting.

15. A strut system comprising:
a piece of strut including an elongate strut body having opposite longitudinal ends, a length extending between the opposite longitudinal ends, and a fitting side defining an external fitting groove extending lengthwise of the body, wherein the external fitting groove has opposite open groove ends at the opposite longitudinal ends of the strut body,
a strut fitting for the piece of strut, the strut fitting including a fitting body having opposite ends, a length extending between the opposite ends, first and second opposite faces extending along the length of the body, and opposite sides disposed between the first and second faces and extending along the length of the body, wherein the first face and at least portions of the opposite sides adjacent the first face define a first cross-sectional shape of the fitting body sized and shaped for insertion through one of the open groove ends and into the external fitting groove of the piece of strut for connecting the strut fitting to the piece of strut, wherein the second face of the fitting body defines a groove extending along the length of the body,
wherein the second face and at least portions of the opposite side adjacent the second face define a second cross-sectional shape of the fitting body that is sized and shaped for insertion through one of the open groove ends and into the external fitting groove of the piece of strut for connecting the strut fitting to the piece of strut.

16. The strut system set forth in claim 15, wherein the first face of the fitting body defines a groove extending along the length of the body.

17. The strut system set forth in claim 16, further comprising a resiliently deflectable catch secured in the groove defined by the first face and protruding outward from the first face.

18. The strut system set forth in claim 15, further comprising a resiliently deflectable catch secured to the first face and protruding outward from the first face.

19. A strut assembly comprising:
strut fitting having at least one side defining a dovetail-shaped groove, the strut fitting comprising:
a fitting body having opposite ends, a length extending between the opposite ends, first and second opposite faces extending along the length of the body, and opposite sides disposed between the first and second faces and extending along the length of the body, wherein the first face and at least portions of the opposite sides adjacent the first face define a first cross-sectional shape of the fitting body that is generally dovetail-shaped; and
a catch secured to and extending outward from the first face of the fitting body, wherein the catch is resiliently deflectable relative to the fitting body; and
a strut having at least one side defining a dovetail-shaped groove, wherein the first cross-sectional shape of the fitting body is sized and shaped for sliding reception in the dovetail-shaped groove of the strut,
wherein the dovetail-shaped groove of the strut defines an opening in communication with an interior of the strut,
wherein the first cross-sectional shape of the fitting body is received in the dovetail-shaped groove of the strut,
wherein the catch is received in the opening of the dovetail-shaped groove of the strut to restrict sliding of the strut fitting along the dovetail-shaped groove of the strut.

20. A strut fitting for a strut having at least one side defining a dovetail-shaped groove, the strut fitting comprising:
a fitting body having opposite ends, a length extending between the opposite ends, first and second opposite faces extending along the length of the body, and opposite sides disposed between the first and second faces and extending along the length of the body, wherein the first face and at least portions of the opposite sides adjacent the first face define a first cross-sectional shape of the fitting body that is generally dovetail-shaped; and
a spring secured to and extending outward from the first face of the fitting body, wherein the spring is resiliently deflectable relative to the fitting body,
wherein the fitting body defines a through opening extending through the first and second faces,
wherein the spring is spaced apart from the through opening relative to the length of the fitting body.

21. The strut fitting set forth in claim 20, wherein the spring is resiliently deflectable toward the first face of the fitting body.

22. The strut fitting set forth in claim 20, wherein the second face and portions of the opposite sides adjacent the second face define a second cross-sectional shape of the fitting body that is generally dovetail-shaped.

23. The strut fitting set forth in claim 20, wherein the fitting body defines a second through opening extending through the first and second faces, wherein the second through opening spaced apart from the first through opening relative to the length of the fitting body.

24. The strut fitting set forth in claim 23, wherein the spring is disposed between the through opening and the second through opening relative to the length of the fitting body.

25. The strut fitting set forth in claim 20, in combination with the strut having at least one side defining a dovetail-shaped groove, wherein the first cross-sectional shape of the fitting body is sized and shaped for sliding reception in the dovetail-shaped groove of the strut.

26. The strut fitting in combination with the strut set forth in claim 25, wherein the spring is configured to resiliently deflect as the first cross-sectional shape of the fitting body is slidingly received in the dovetail-shaped groove of the strut.

* * * * *